(12) United States Patent
Tashiro et al.

(10) Patent No.: US 8,908,284 B2
(45) Date of Patent: Dec. 9, 2014

(54) ZOOM LENS AND OPTICAL APPARATUS EQUIPPED WITH ZOOM LENS

(71) Applicant: Canon Kabushiki Kaisha, Tokyo (JP)

(72) Inventors: Yoshihisa Tashiro, Nikko (JP); Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/915,360

(22) Filed: Jun. 11, 2013

(65) Prior Publication Data

US 2013/0335830 A1 Dec. 19, 2013

(30) Foreign Application Priority Data

Jun. 14, 2012 (JP) .................................. 2012-134846

(51) Int. Cl.
*G02B 15/14* (2006.01)
*G02B 27/64* (2006.01)
*G02B 15/173* (2006.01)

(52) U.S. Cl.
CPC ................ *G02B 15/14* (2013.01); *G02B 27/64* (2013.01); *G02B 15/173* (2013.01)
USPC .......................................... 359/683; 359/557

(58) Field of Classification Search
CPC ...... G02B 15/14; G02B 15/173; G02B 15/16; G02B 15/20
USPC .................................. 359/557, 683, 684, 685
See application file for complete search history.

(56) References Cited

U.S. PATENT DOCUMENTS

| | | | | |
|---|---|---|---|---|
| 7,126,758 B2* | 10/2006 | Fujimoto et al. | ............... | 359/676 |
| 7,190,520 B2* | 3/2007 | Misaka | ......................... | 359/557 |
| 7,268,954 B2* | 9/2007 | Fujimoto | ...................... | 359/676 |
| 7,453,642 B2* | 11/2008 | Fujimoto et al. | ............... | 359/557 |
| 7,532,412 B2* | 5/2009 | Hatada | ........................... | 359/688 |
| 7,986,458 B2* | 7/2011 | Toyoda | ......................... | 359/557 |
| 8,405,906 B2* | 3/2013 | Mizuguchi et al. | ........... | 359/557 |
| 2011/0122506 A1 | 5/2011 | Ito | | |

FOREIGN PATENT DOCUMENTS

JP 2010-044372 A 2/2010

* cited by examiner

*Primary Examiner* — David N Spector
(74) *Attorney, Agent, or Firm* — Canon USA Inc IP Division

(57) ABSTRACT

A zoom lens includes, in order from object side to image side, a positive first lens unit, a negative second lens unit, a positive third lens unit, a negative fourth lens unit, and a rear lens unit including, in order from object side to image side, a positive first lens subunit, a negative second lens subunit, and a positive third lens subunit. The relationship between the combined focal length of the first and second lens units at wide-angle end, the combined focal length of the third lens unit and the lens units on the image side of the third lens unit at wide-angle end, the focal length of the second lens subunit, and the focal length of the rear lens unit at telephoto end is appropriately set.

18 Claims, 35 Drawing Sheets

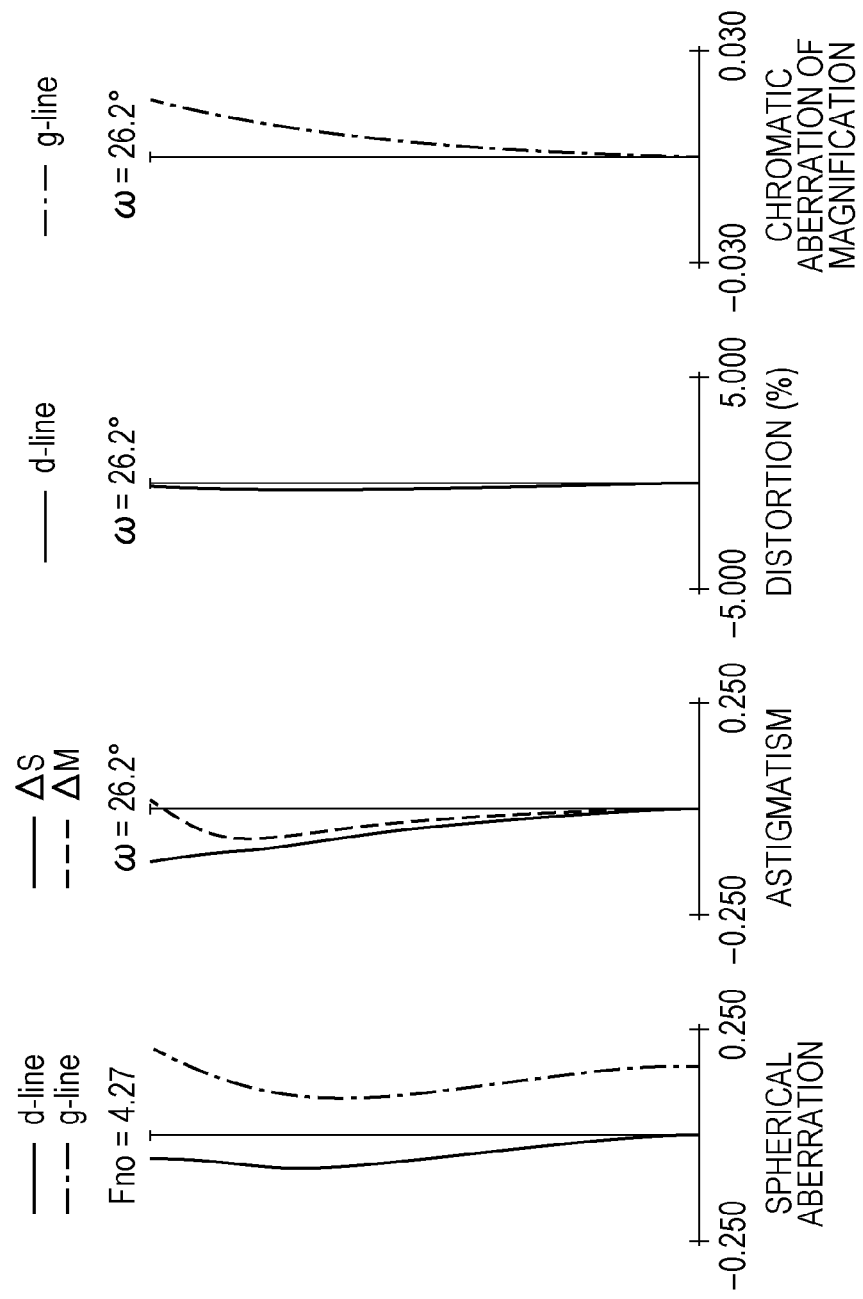

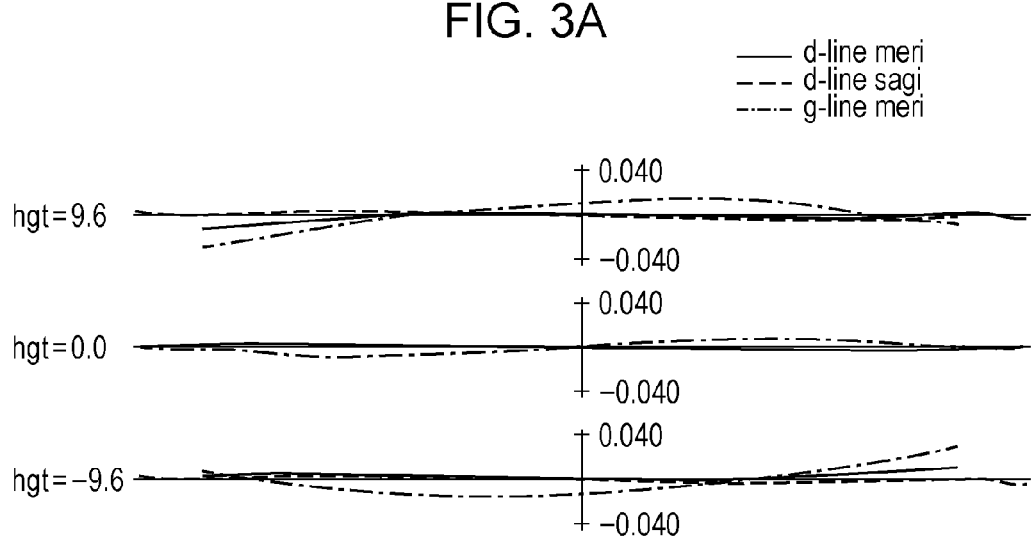
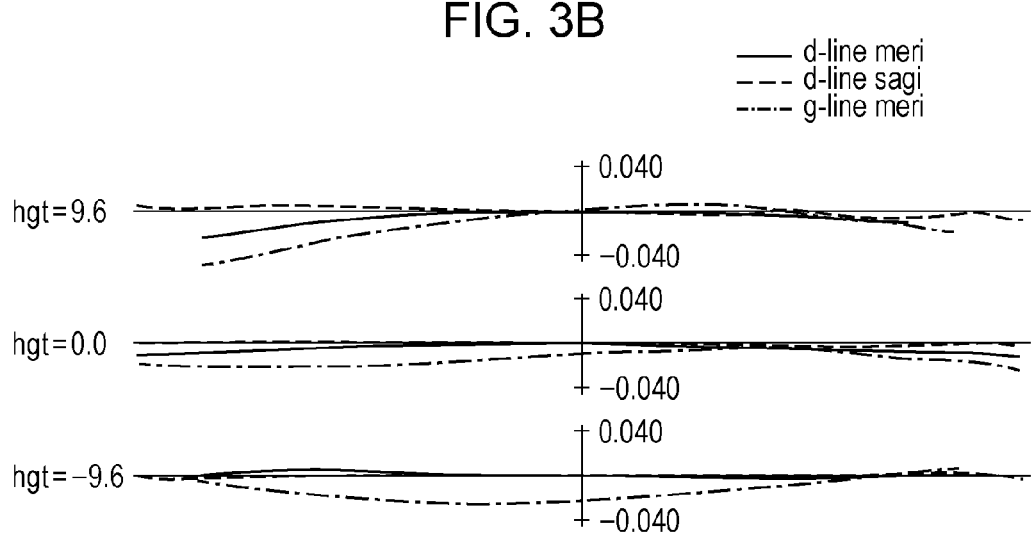

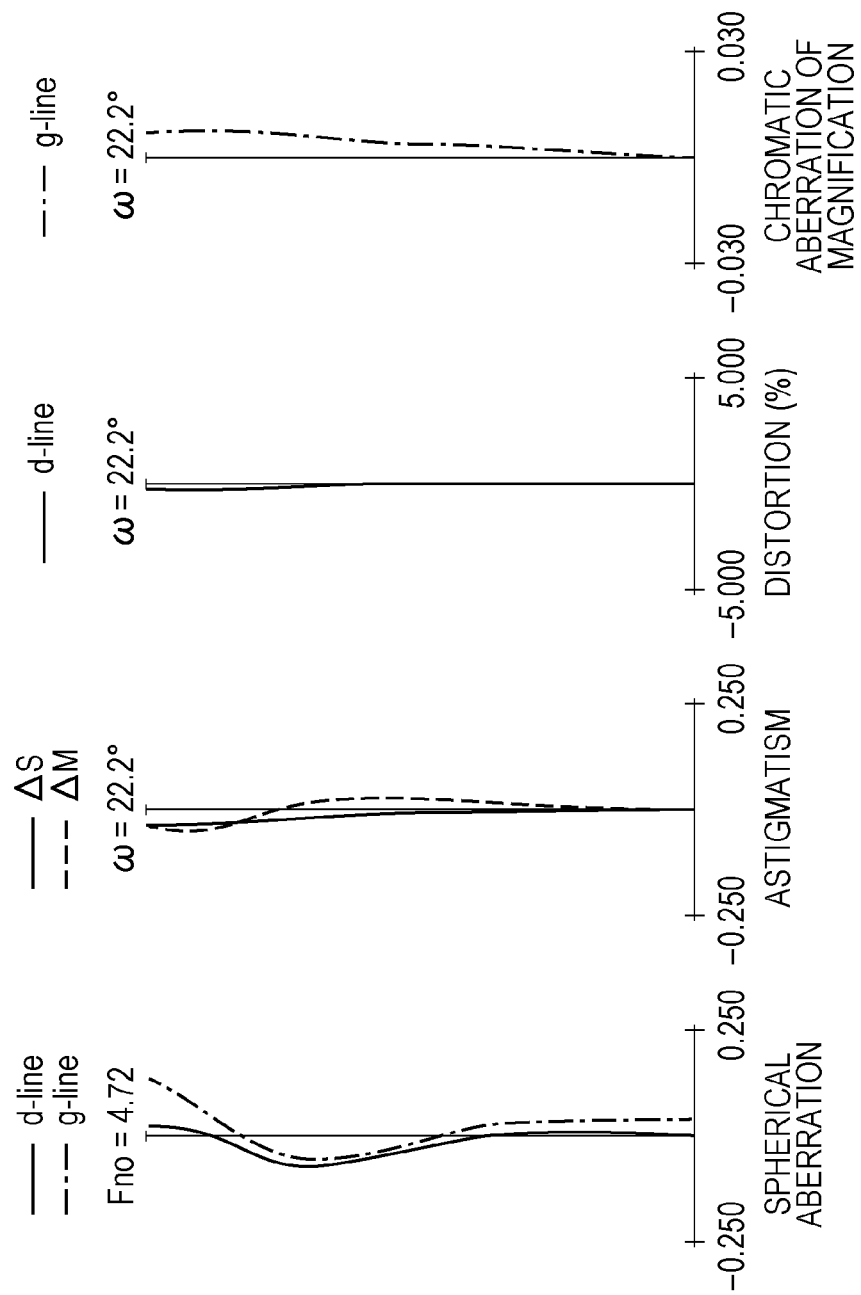

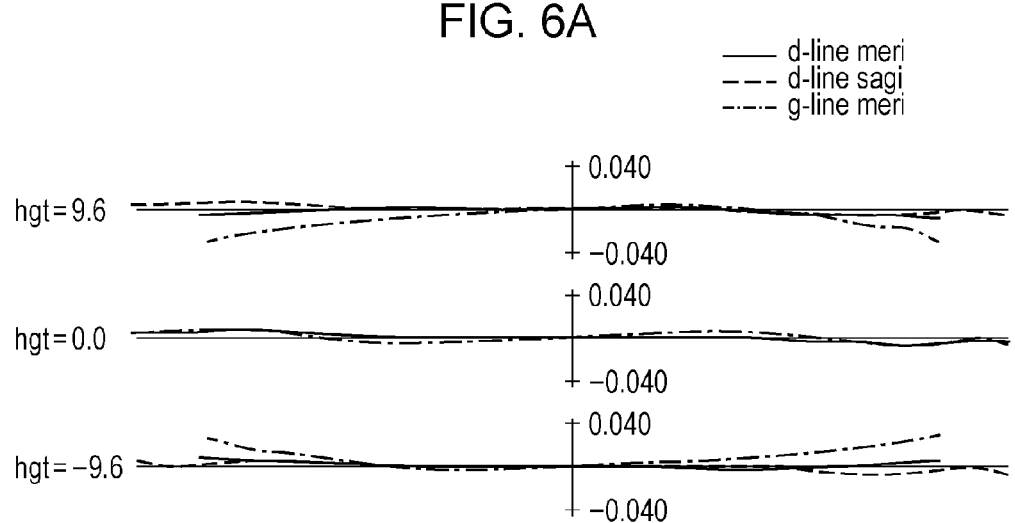
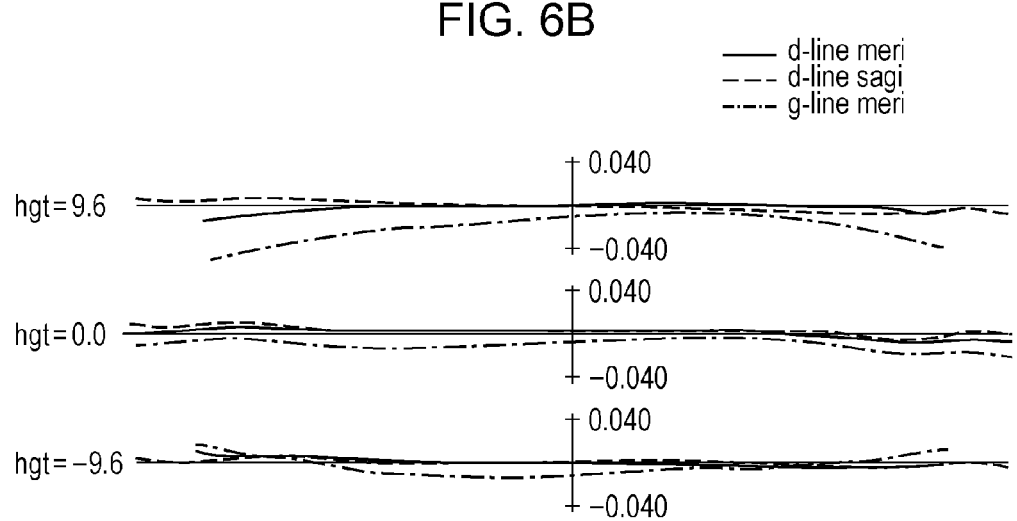

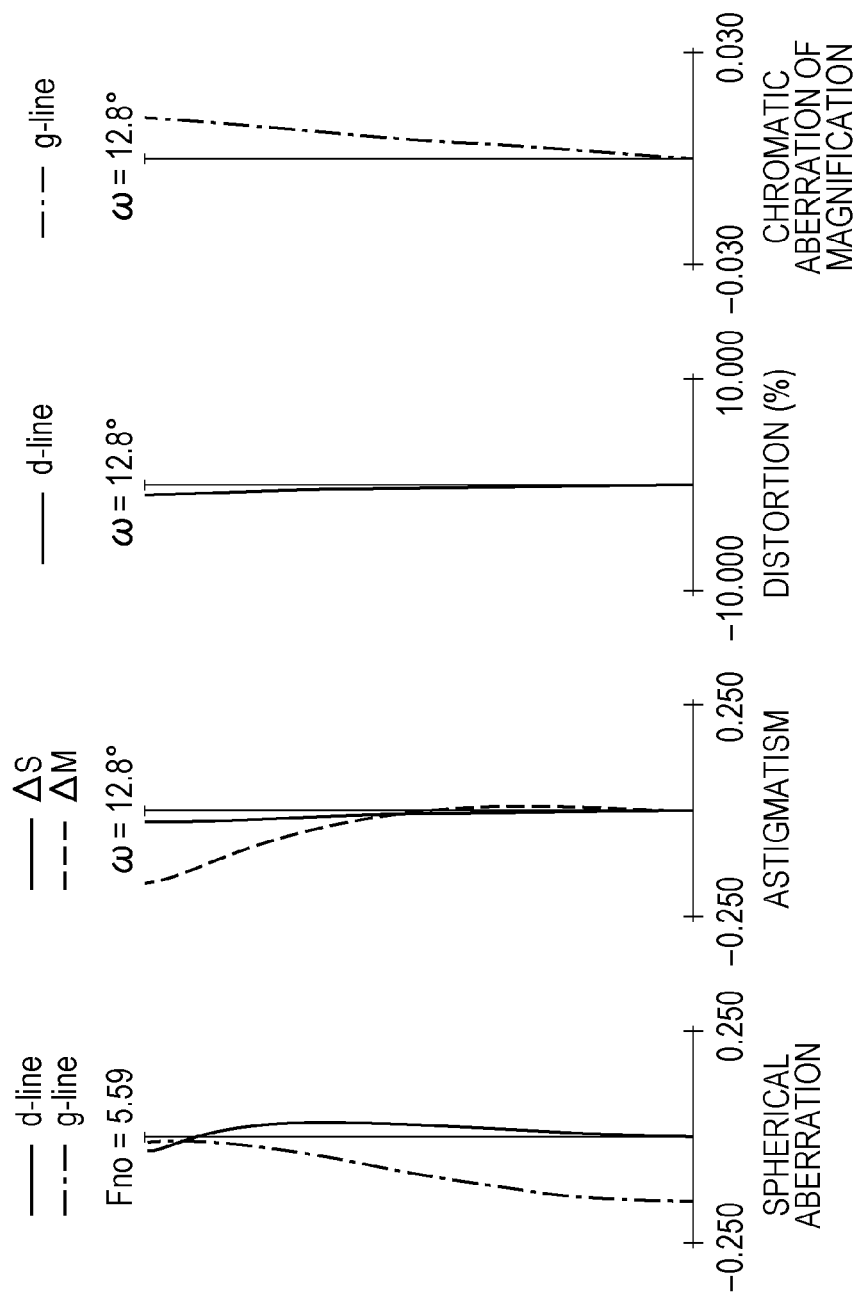

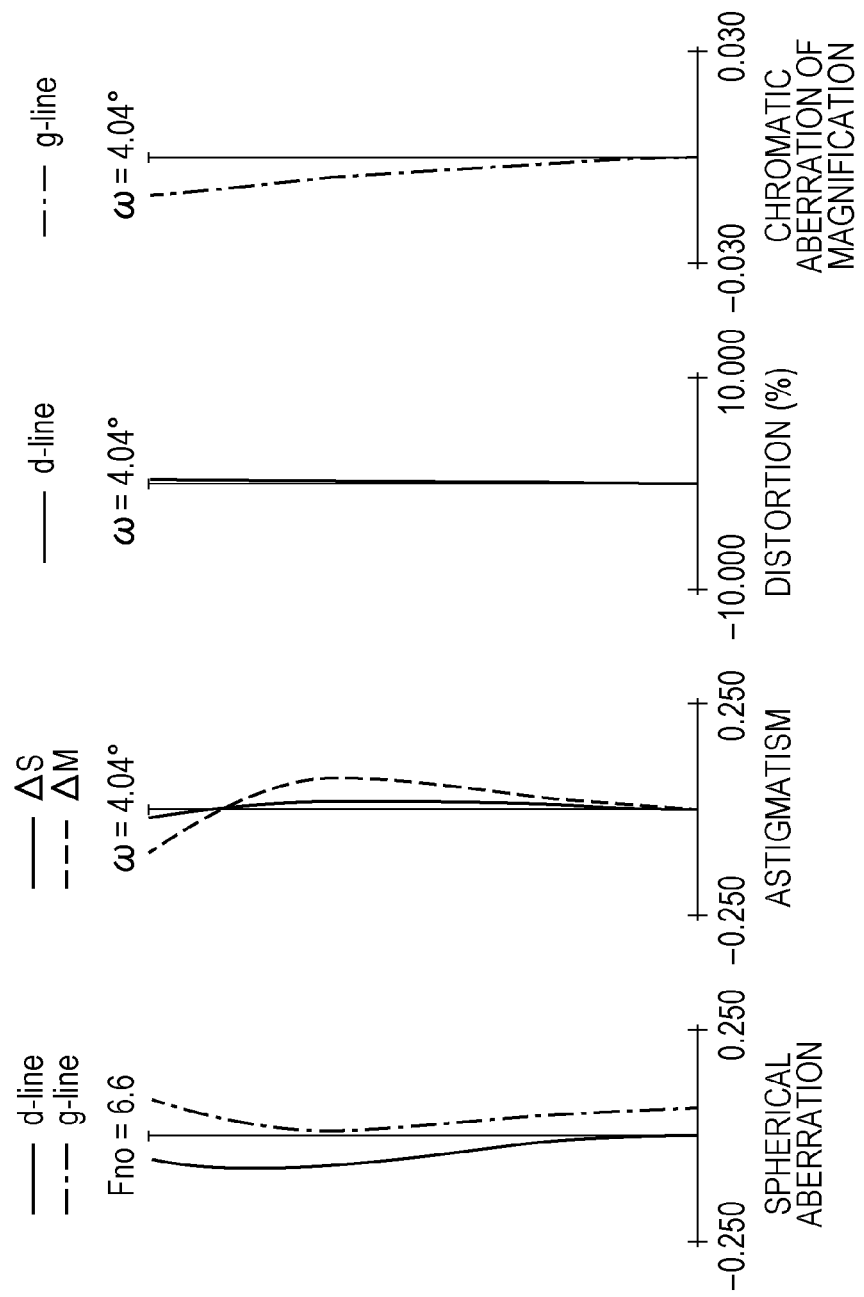

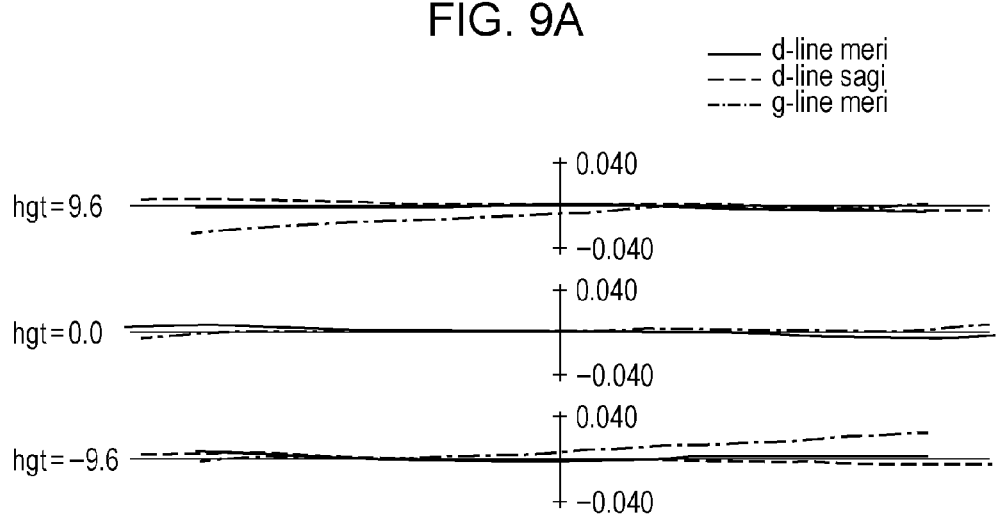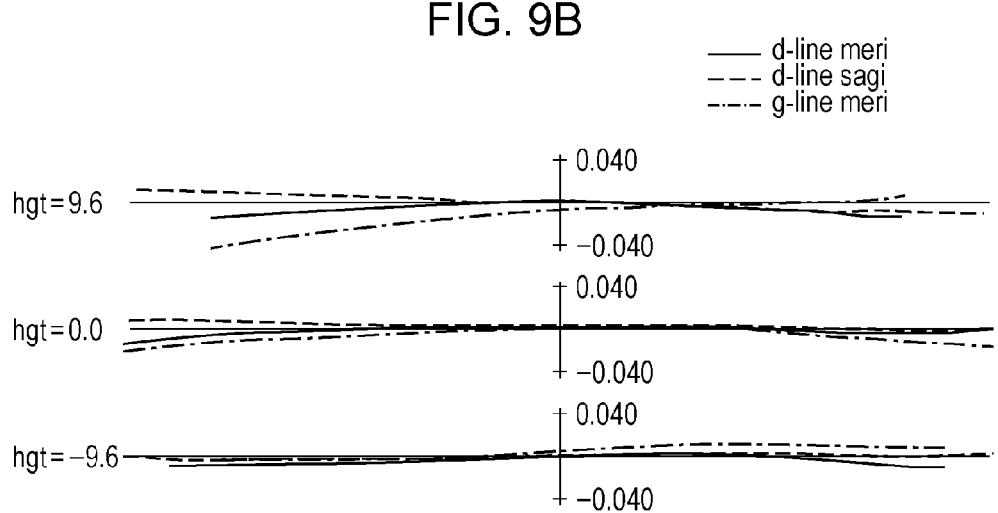

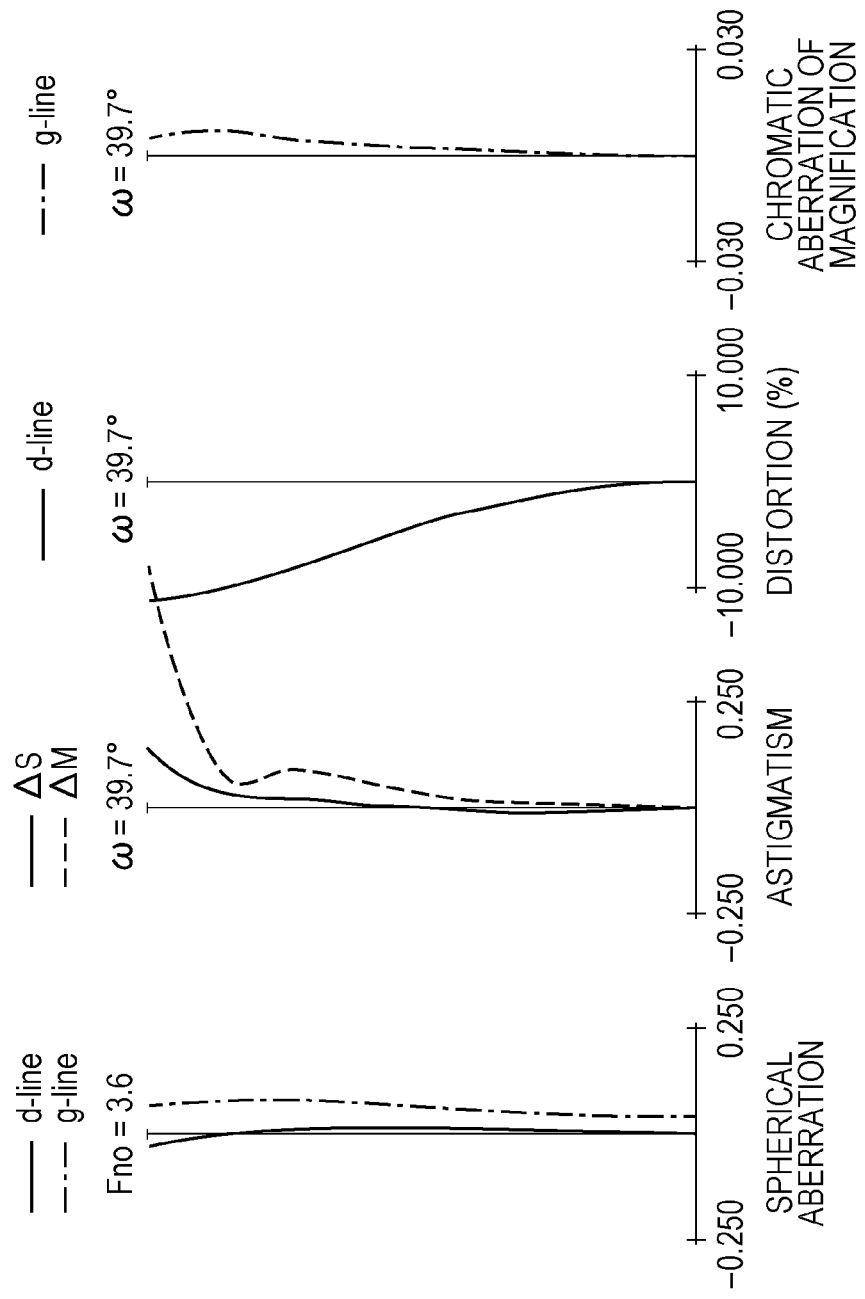

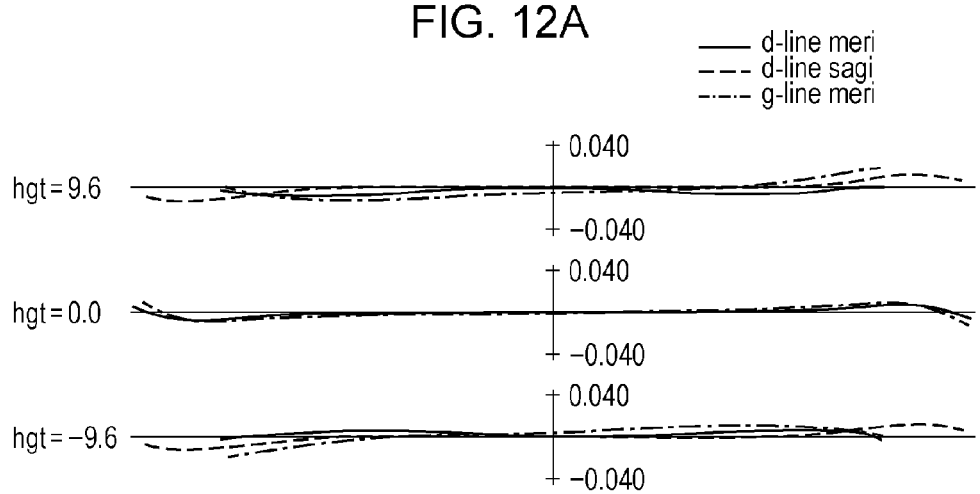
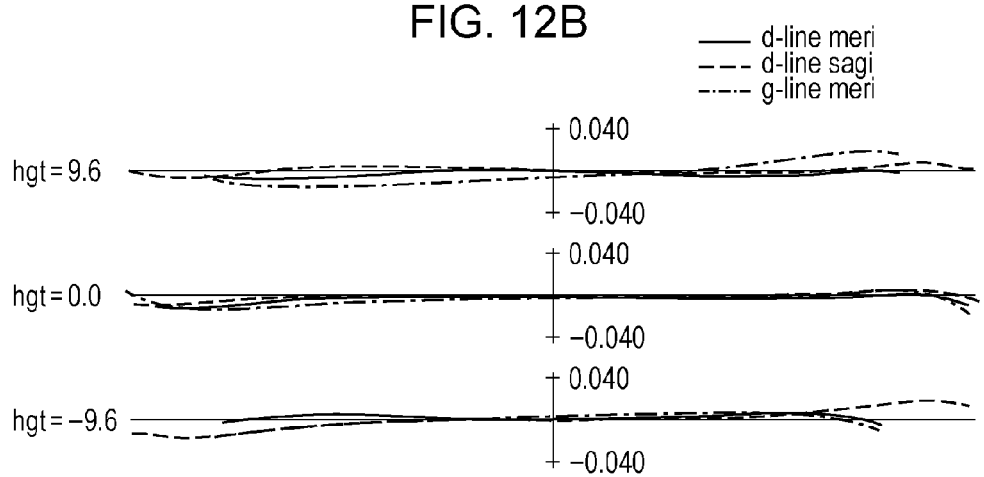

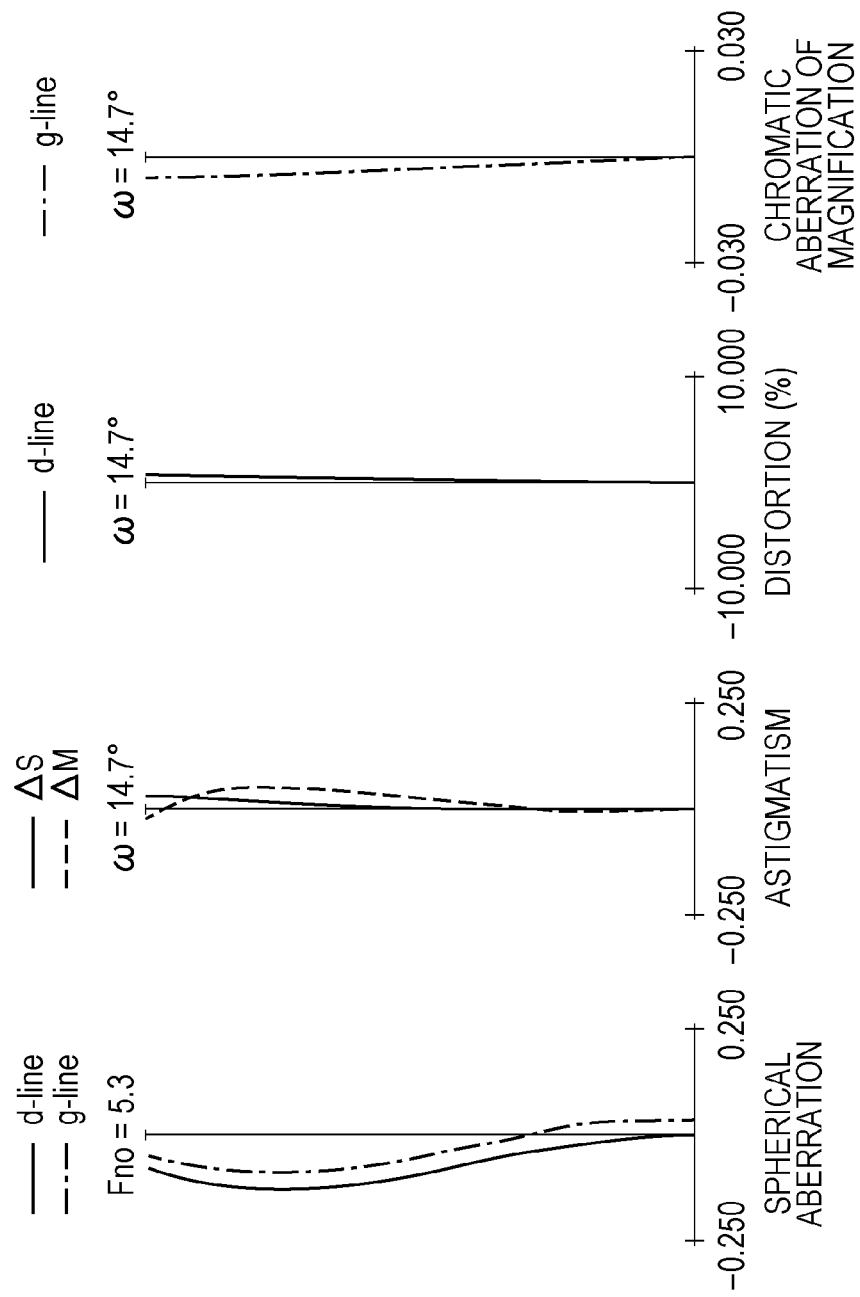

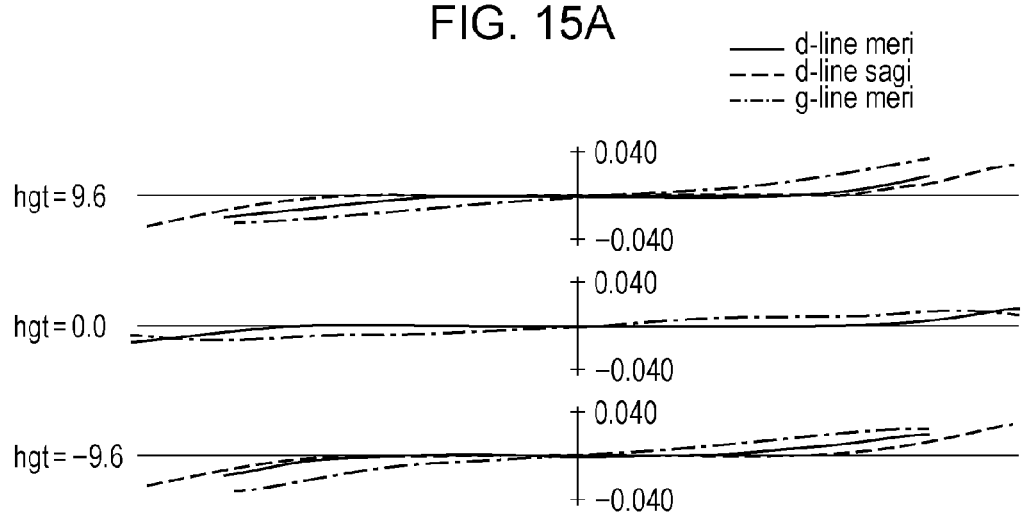
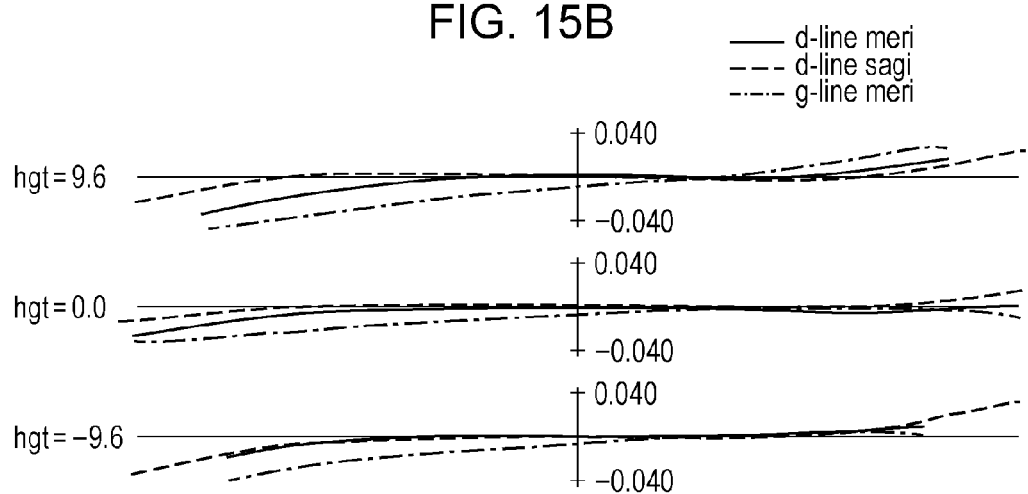

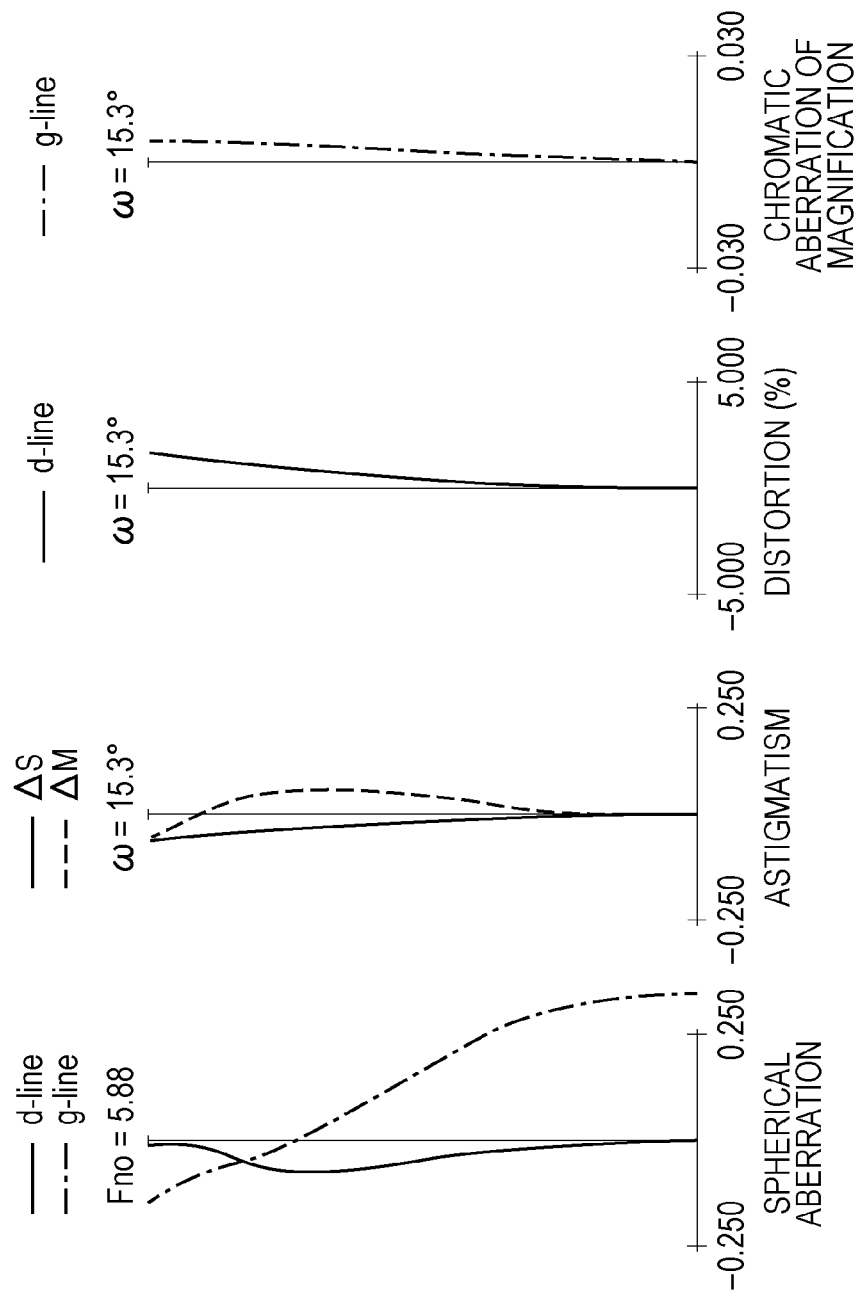

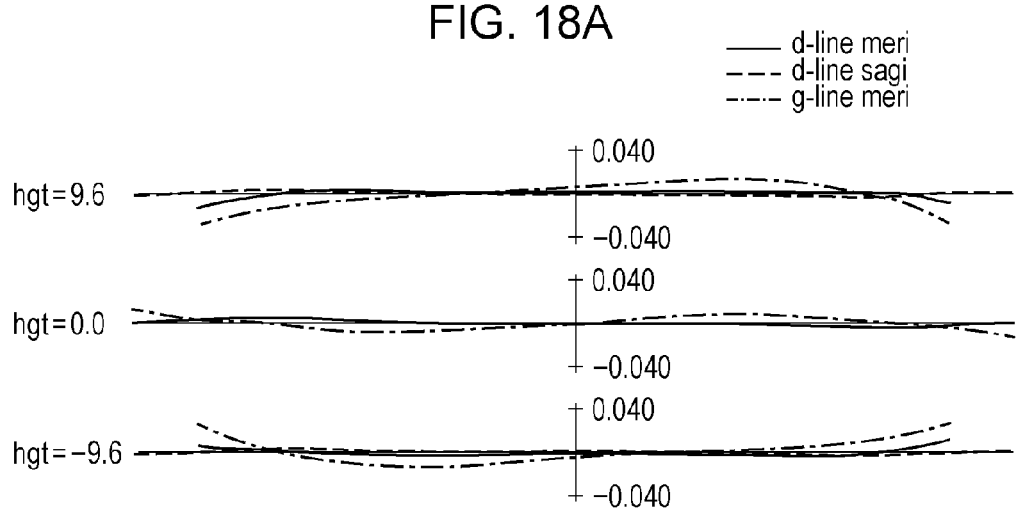
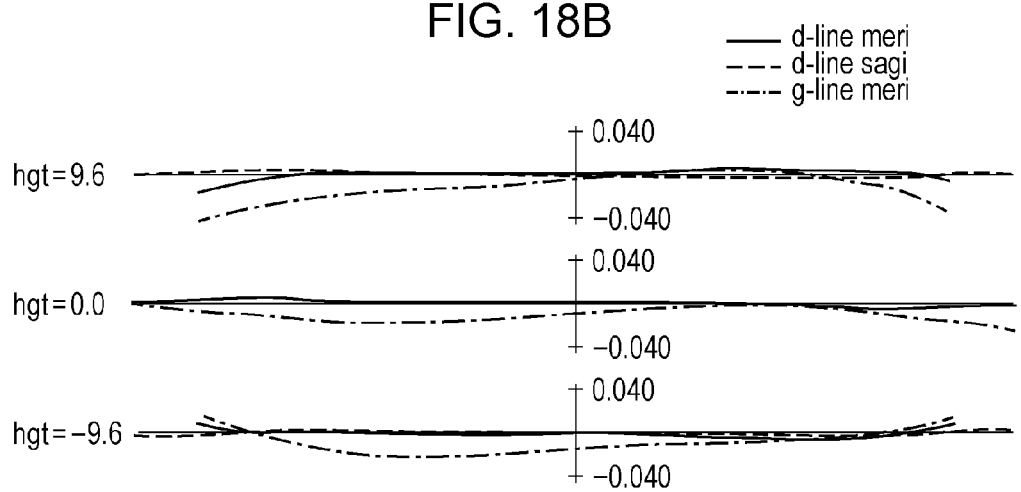

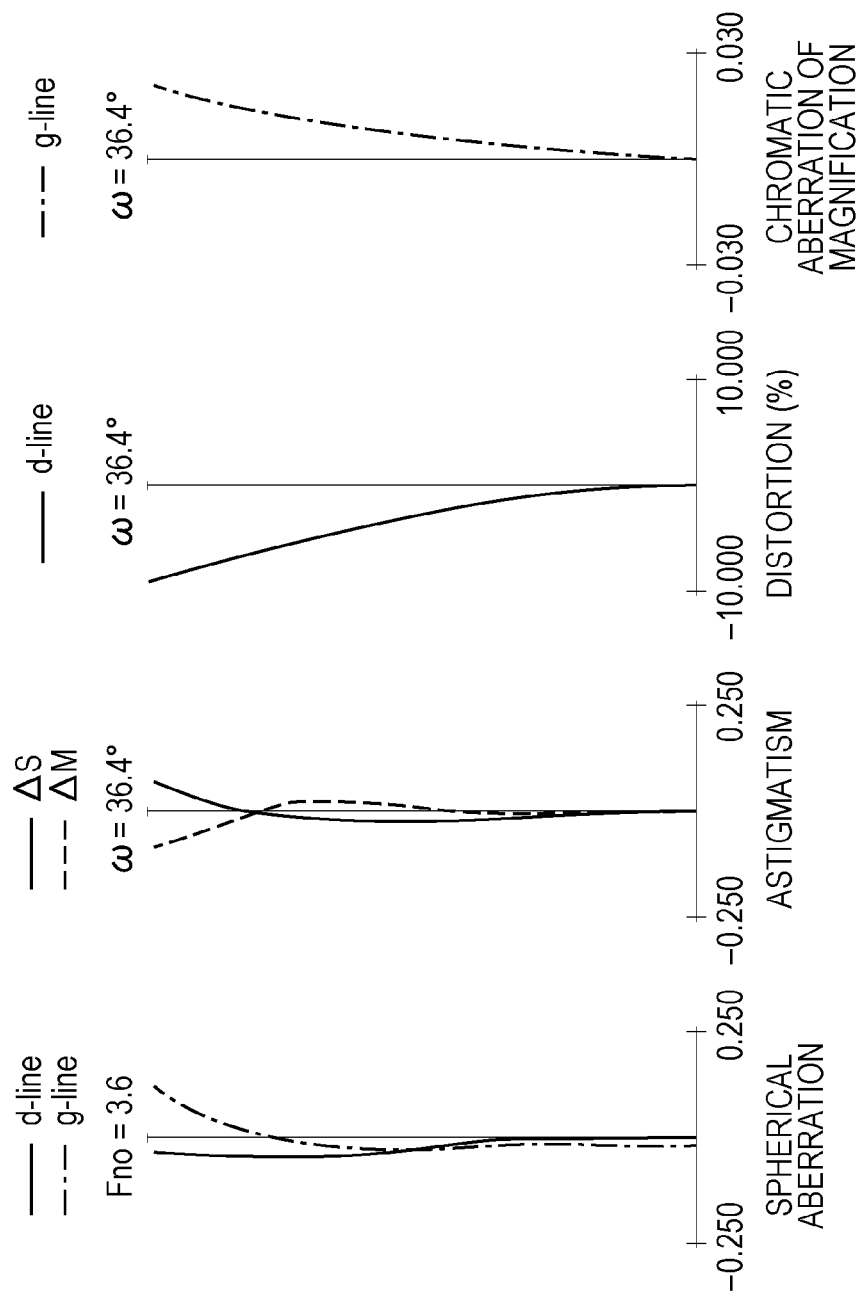

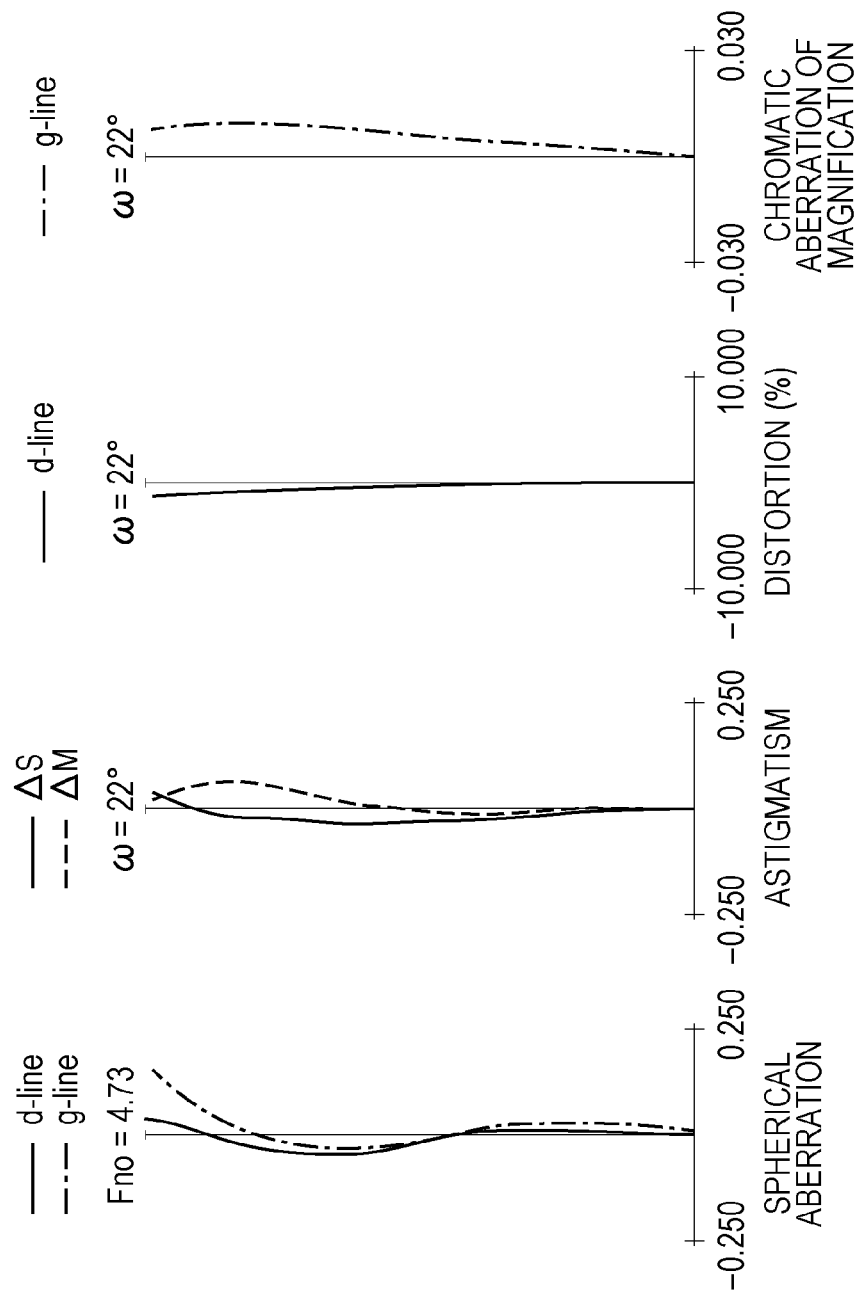

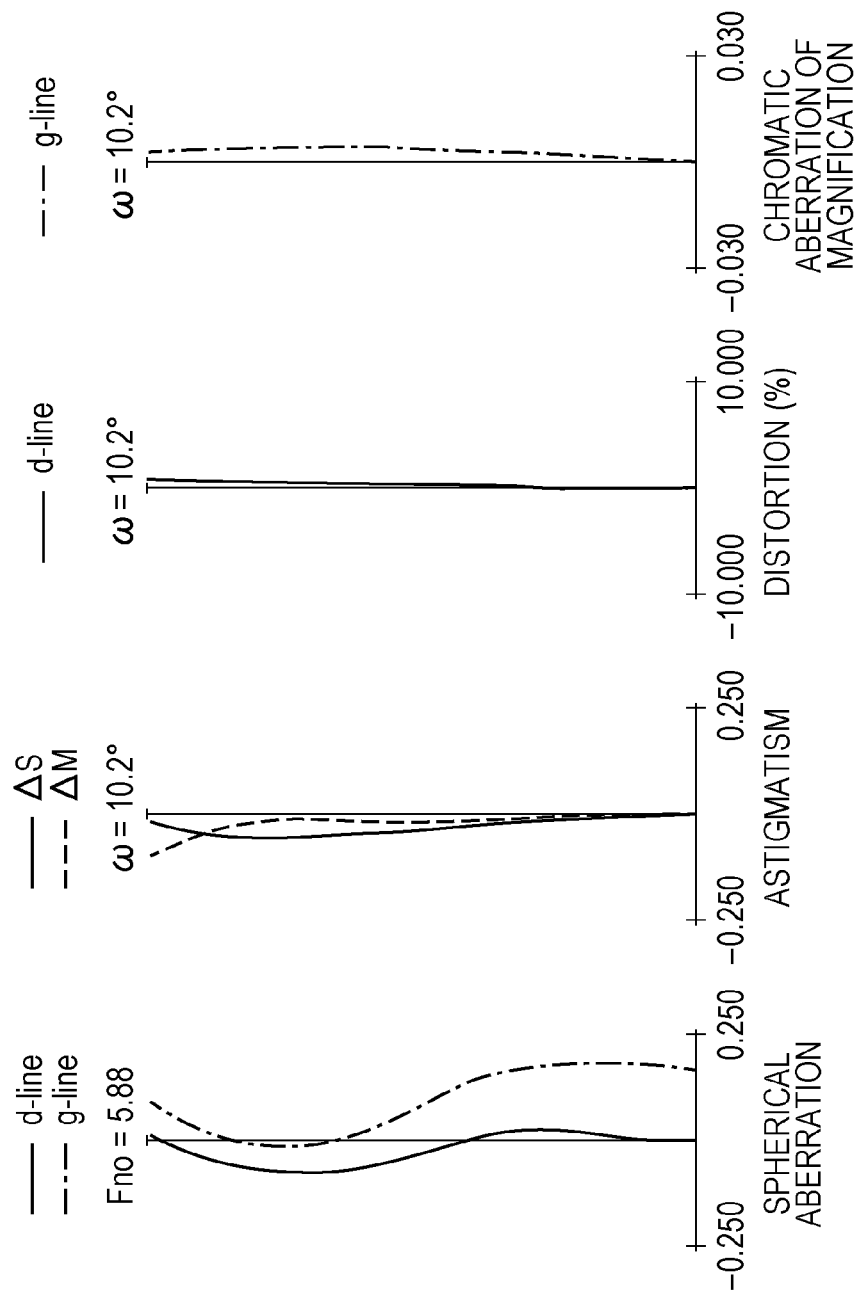

ZOOM LENS AND OPTICAL APPARATUS EQUIPPED WITH ZOOM LENS

BACKGROUND OF THE INVENTION

1. Field of the Invention

The present disclosure relates to a zoom lens and an optical apparatus, such as an interchangeable lens, a still camera, a video camera, or a digital still camera, equipped with the zoom lens.

2. Description of the Related Art

In recent years, in optical apparatuses, such as digital still cameras and video cameras, employing solid state image pickup elements, a zoom lens that has high optical performance, that has a sufficient zooming ratio, that is capable of image stabilization, and that is compact has been required.

As a way to achieve these requirements, a method has been proposed in which a plurality of lens units are moved during zooming, and one of the lens units serves as an image stabilizing unit.

Japanese Patent Laid-Open No. 2010-044372 discloses a zoom lens including five units of, in order from the object side, positive, negative, positive, negative, and positive refractive power, in which the fifth lens unit is divided into positive, negative, and positive lens subunits, and the negative lens subunit of the fifth lens unit performs image stabilization.

Each embodiment of Japanese Patent Laid-Open No. 2010-044372 is a telephoto zoom lens, in which the first lens unit does not move during zooming. If this configuration is applied to a normal zoom lens, the front lens diameter increases with the increase in the angle of view at the wide-angle end, and the downsizing of the zoom lens is difficult.

It is assumed that the zoom lens of Japanese Patent Laid-Open No. 2010-044372 is used in a single-lens reflex camera having a long flange back, and the zoom lens has a long back focus. Therefore, if this configuration is applied, as a normal zoom lens, to a camera from which an instant return mirror is removed to shorten the flange back, downsizing as an interchangeable lens is difficult because of its long optical total length.

SUMMARY OF THE INVENTION

In an aspect of the present invention provides a zoom lens that has high optical performance throughout the zoom range including the normal zoom range, that has a short back focus, that is compact, and that is capable of good image stabilization.

In an aspect of the present invention, a zoom lens includes, in order from the object side to the image side, a first lens unit of positive refractive power, a second lens unit of negative refractive power, a third lens unit of positive refractive power, a fourth lens unit of negative refractive power, and a rear lens unit. The rear lens unit includes, in order from the object side to the image side, a first lens subunit of positive refractive power, a second lens subunit of negative refractive power, and a third lens subunit of positive refractive power. During zooming, the distance between the first lens unit and the second lens unit, the distance between the second lens unit and the third lens unit, the distance between the third lens unit and the fourth lens unit, and the distance between the fourth lens unit and the first lens subunit each change. The second lens subunit is movable in a direction having a component perpendicular to the optical axis. The following conditional expressions are satisfied:

$$0.73 < |f12w|/f3Rw < 2.0, \text{ and}$$

$$0.8 < |fis|/fRt < 2.5,$$

where $f12w$ is the combined focal length of the first lens unit and the second lens unit during focusing on an object at infinity at the wide-angle end, $f3Rw$ is the combined focal length of the third lens unit and the lens units placed on the image side of the third lens unit during focusing on an object at infinity at the wide-angle end, $fis$ is the focal length of the second lens subunit, and $fRt$ is the combined focal length of the rear lens unit during focusing on an object at infinity at the telephoto end.

Further features of the present invention will become apparent from the following description of exemplary embodiments with reference to the attached drawings.

BRIEF DESCRIPTION OF THE DRAWINGS

FIGS. 2A, 2B, and 2C are longitudinal aberration diagrams of the zoom lens of the first embodiment during focusing on an object at infinity at the wide-angle end, a middle zoom position, and the telephoto end, respectively.

FIGS. 3A and 3B are lateral aberration diagrams of the zoom lens of the first embodiment in a reference state at the telephoto end (no blur correction) and an image stabilizing state (0.3 degree rotational blur correction), respectively.

FIGS. 5A, 5B, and 5C are longitudinal aberration diagrams of the zoom lens of the second embodiment during focusing on an object at infinity at the wide-angle end, a middle zoom position, and the telephoto end, respectively.

FIGS. 6A and 6B are lateral aberration diagrams of the zoom lens of the second embodiment in a reference state at the telephoto end (no blur correction) and an image stabilizing state (0.3 degree rotational blur correction), respectively.

FIGS. 8A, 8B, and 8C are longitudinal aberration diagrams of the zoom lens of the third embodiment during focusing on an object at infinity at the wide-angle end, a middle zoom position, and the telephoto end, respectively.

FIGS. 9A and 9B are lateral aberration diagrams of the zoom lens of the third embodiment in a reference state at the telephoto end (no blur correction) and an image stabilizing state (0.3 degree rotational blur correction), respectively.

FIGS. 11A, 11B, and 11C are longitudinal aberration diagrams of the zoom lens of the fourth embodiment during focusing on an object at infinity at the wide-angle end, a middle zoom position, and the telephoto end, respectively.

FIGS. 12A and 12B are lateral aberration diagrams of the zoom lens of the fourth embodiment in a reference state at the telephoto end (no blur correction) and an image stabilizing state (0.3 degree rotational blur correction), respectively.

FIGS. 14A, 14B, and 14C are longitudinal aberration diagrams of the zoom lens of the fifth embodiment during focusing on an object at infinity at the wide-angle end, a middle zoom position, and the telephoto end, respectively.

FIGS. 15A and 15B are lateral aberration diagrams of the zoom lens of the fifth embodiment in a reference state at the telephoto end (no blur correction) and an image stabilizing state (0.3 degree rotational blur correction), respectively.

FIGS. 17A, 17B, and 17C are longitudinal aberration diagrams of the zoom lens of the sixth embodiment during focusing on an object at infinity at the wide-angle end, a middle zoom position, and the telephoto end, respectively.

FIGS. 18A and 18B are lateral aberration diagrams of the zoom lens of the sixth embodiment in a reference state at the telephoto end (no blur correction) and an image stabilizing state (0.3 degree rotational blur correction), respectively.

FIGS. 20A, 20B, and 20C are longitudinal aberration diagrams of the zoom lens of the seventh embodiment during focusing on an object at infinity at the wide-angle end, a middle zoom position, and the telephoto end, respectively.

DESCRIPTION OF THE EMBODIMENTS

Figure 1:
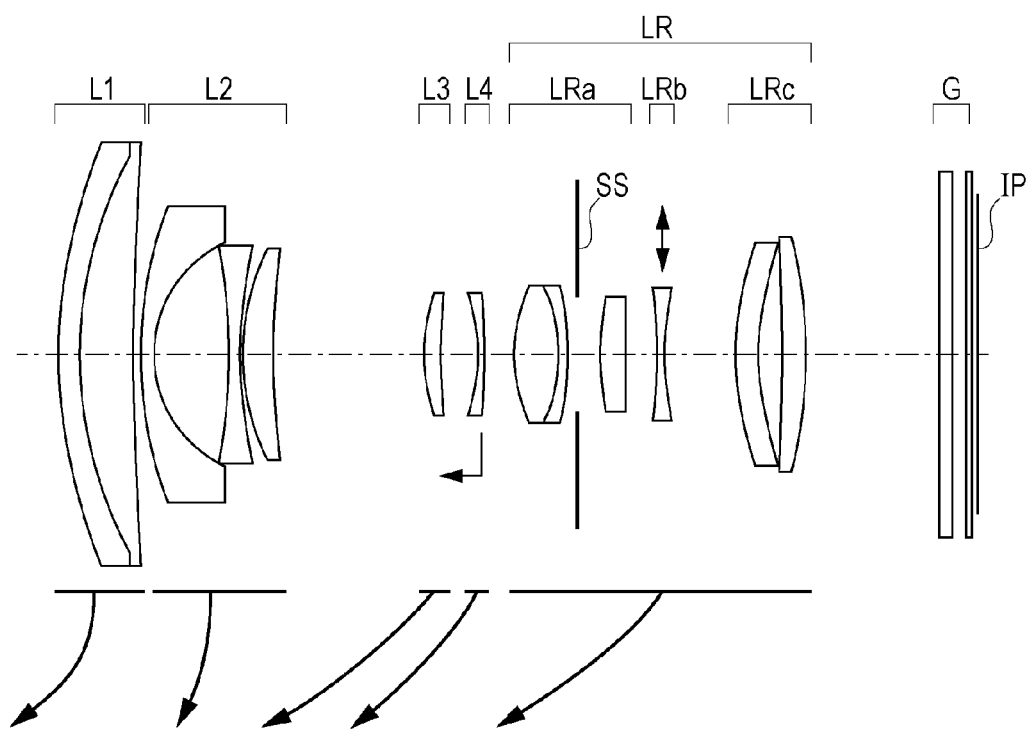
FIG. 1 is a lens sectional view of a zoom lens of a first embodiment at the wide-angle end.
Figure 2A:
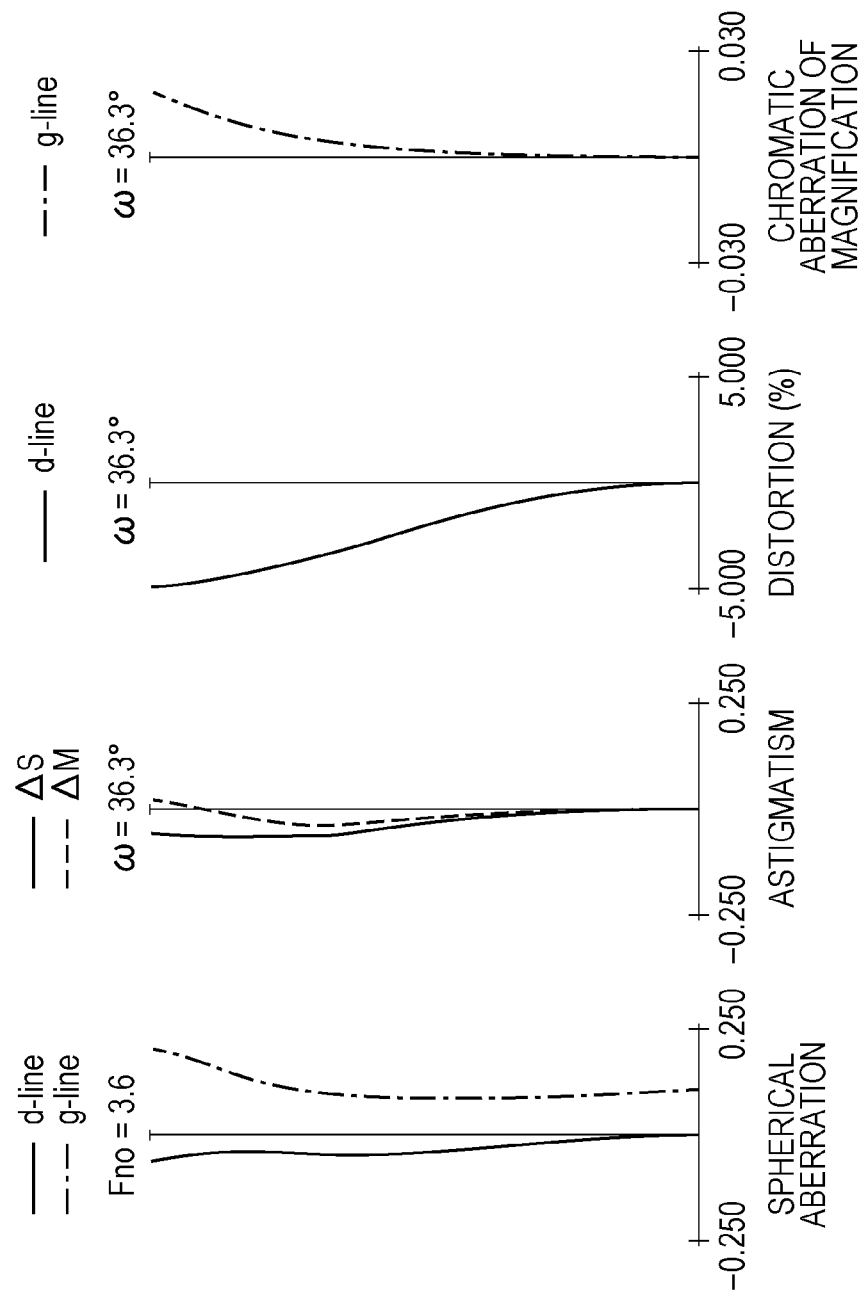
Figure 2C:
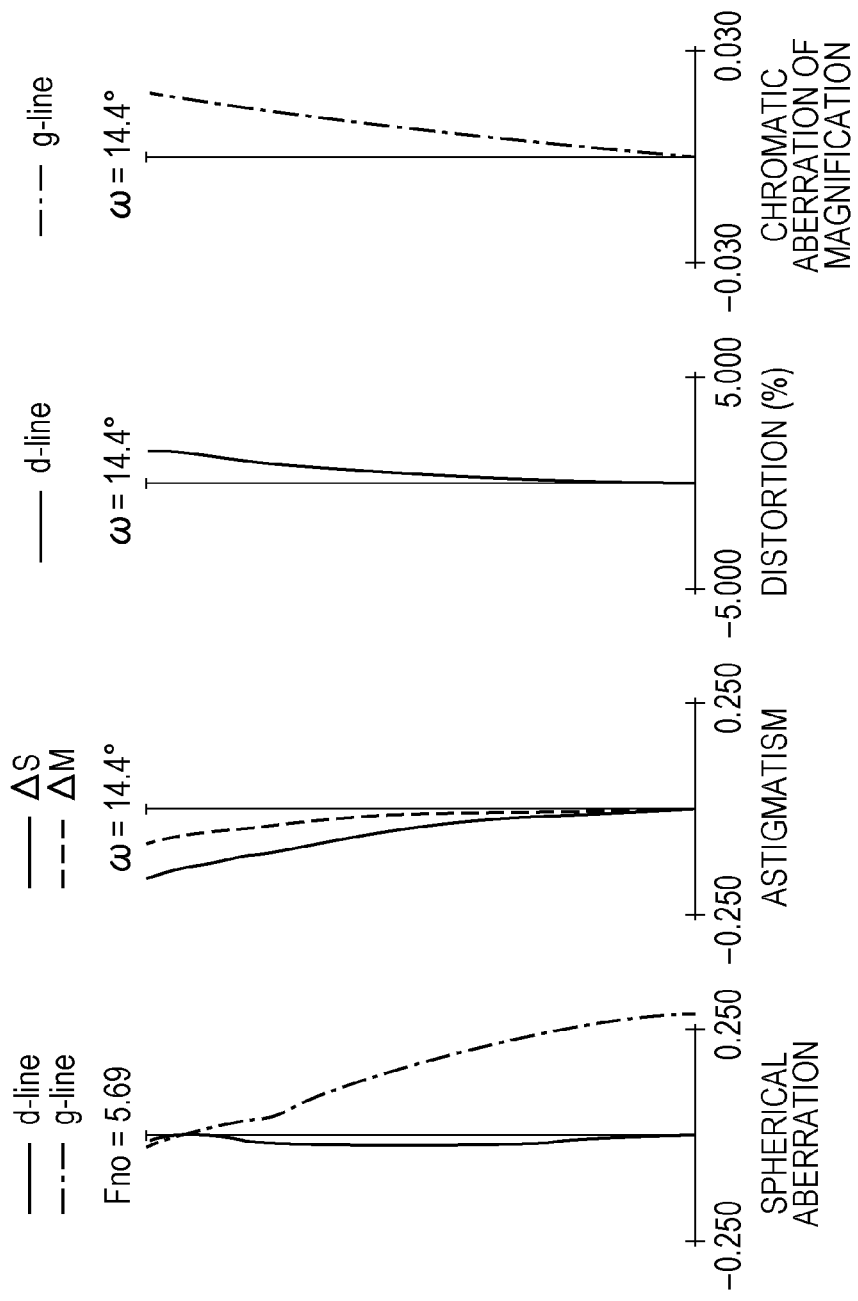
Figure 4:
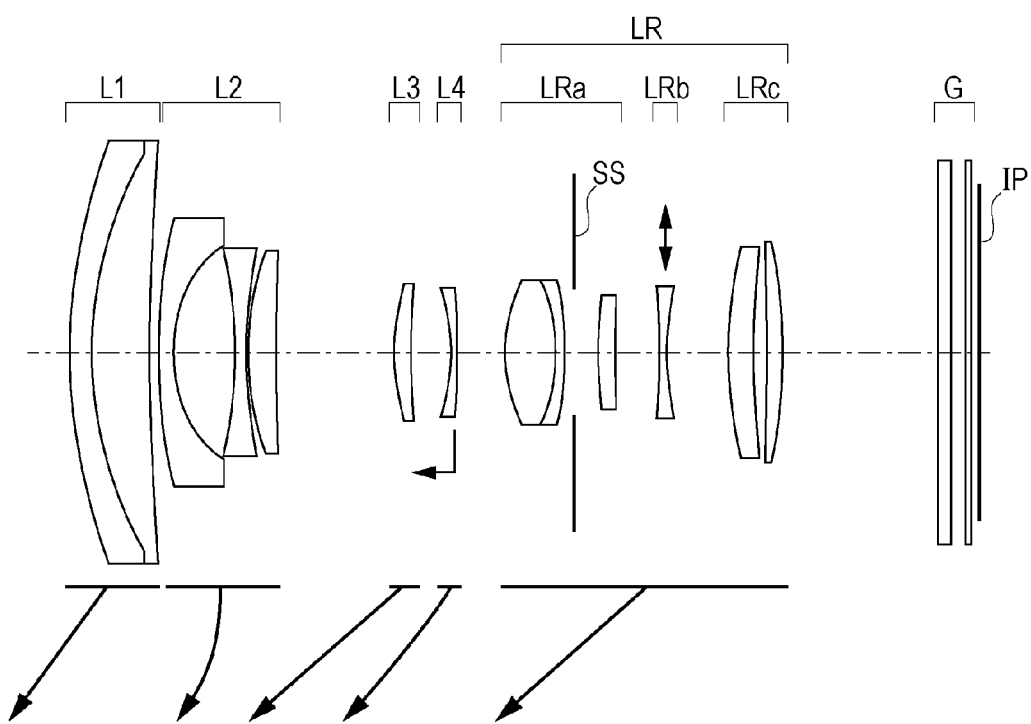
FIG. 4 is a lens sectional view of a zoom lens of a second embodiment at the wide-angle end.
Figure 5A:
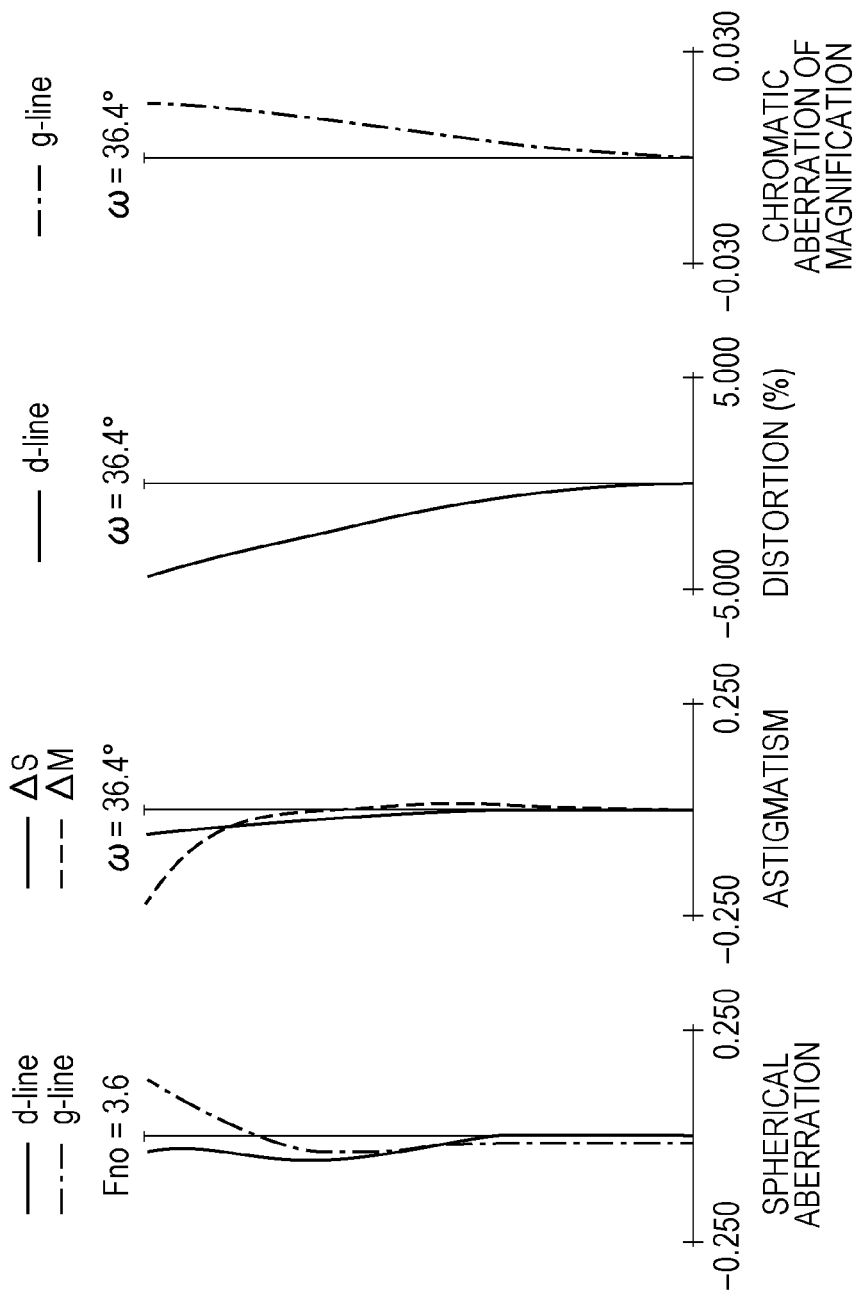
Figure 5C:
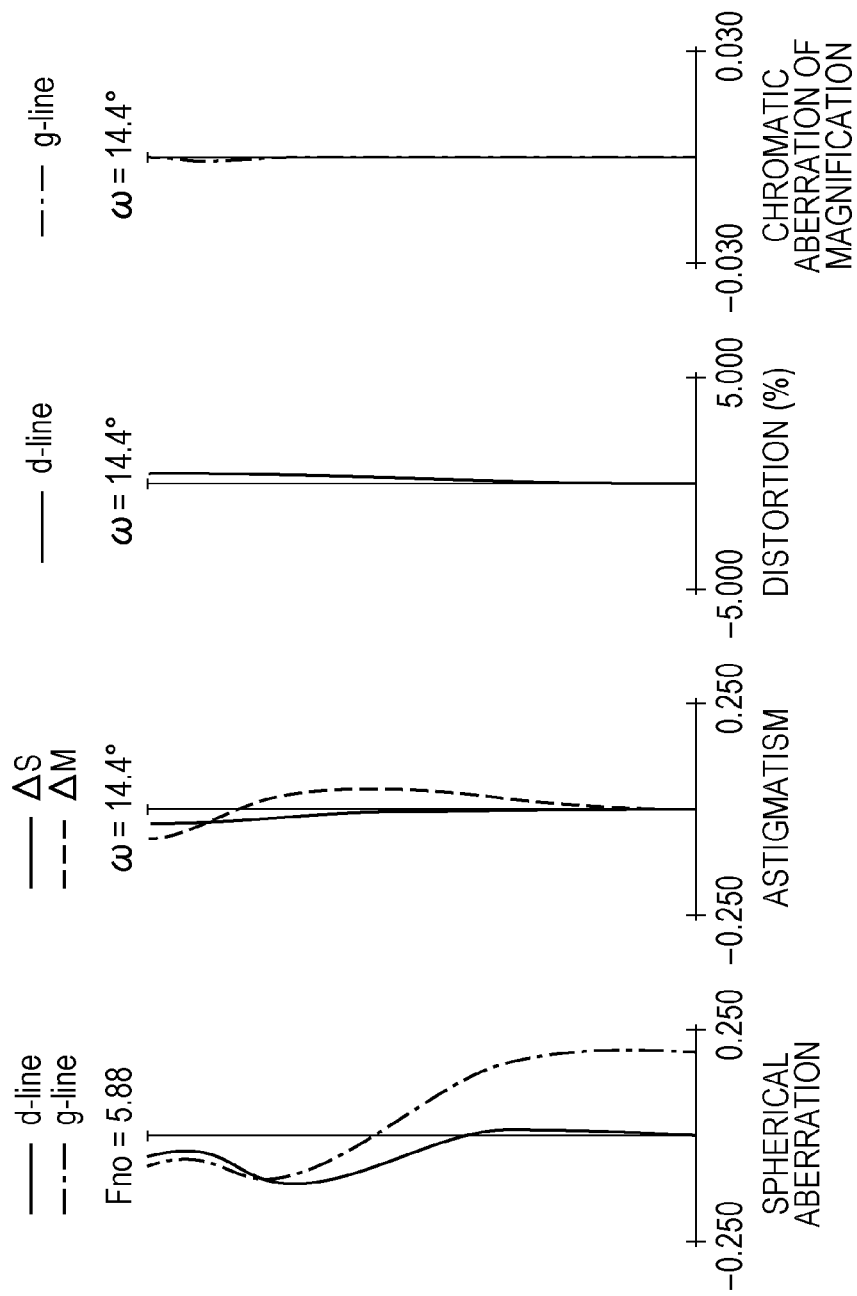
Figure 7:
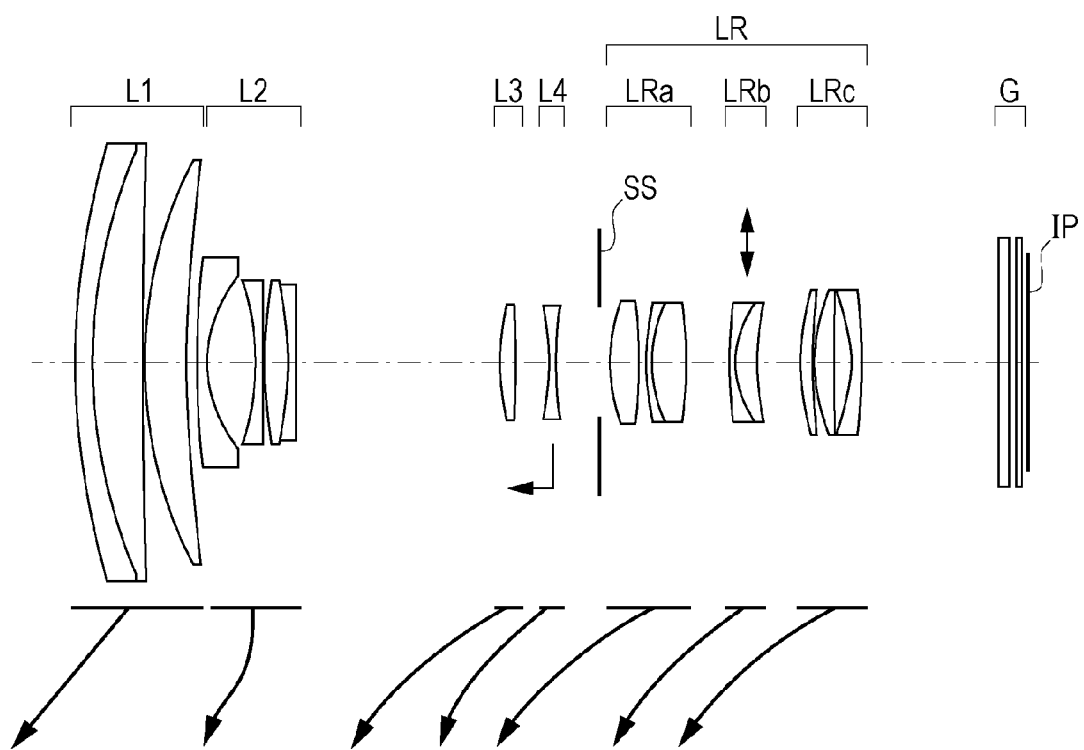
FIG. 7 is a lens sectional view of a zoom lens of a third embodiment at the wide-angle end.
Figure 8A:
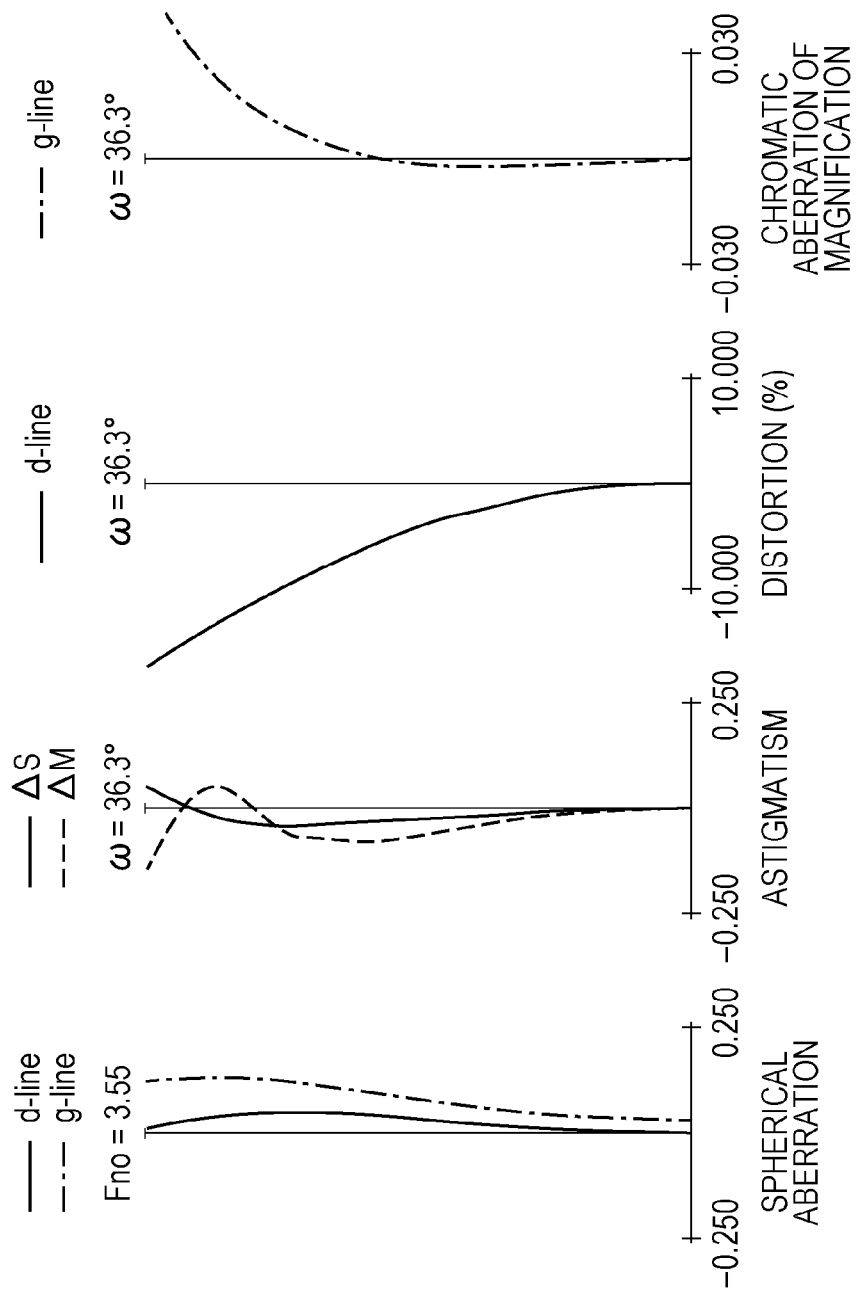
Figure 10:
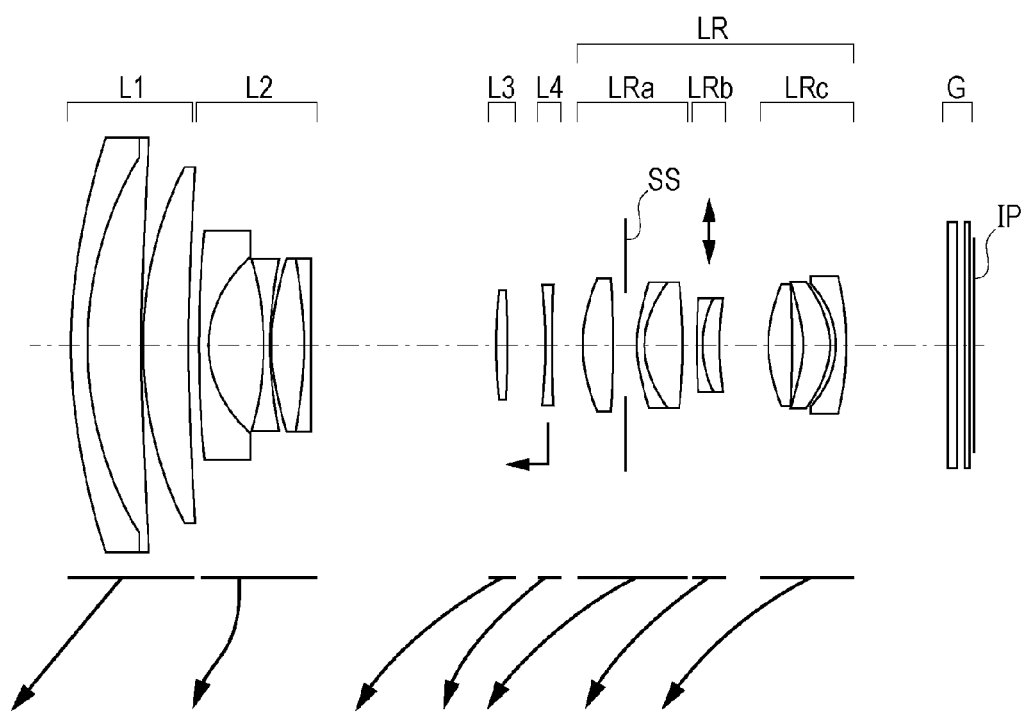
FIG. 10 is a lens sectional view of a zoom lens of a fourth embodiment at the wide-angle end.
Figure 11B:
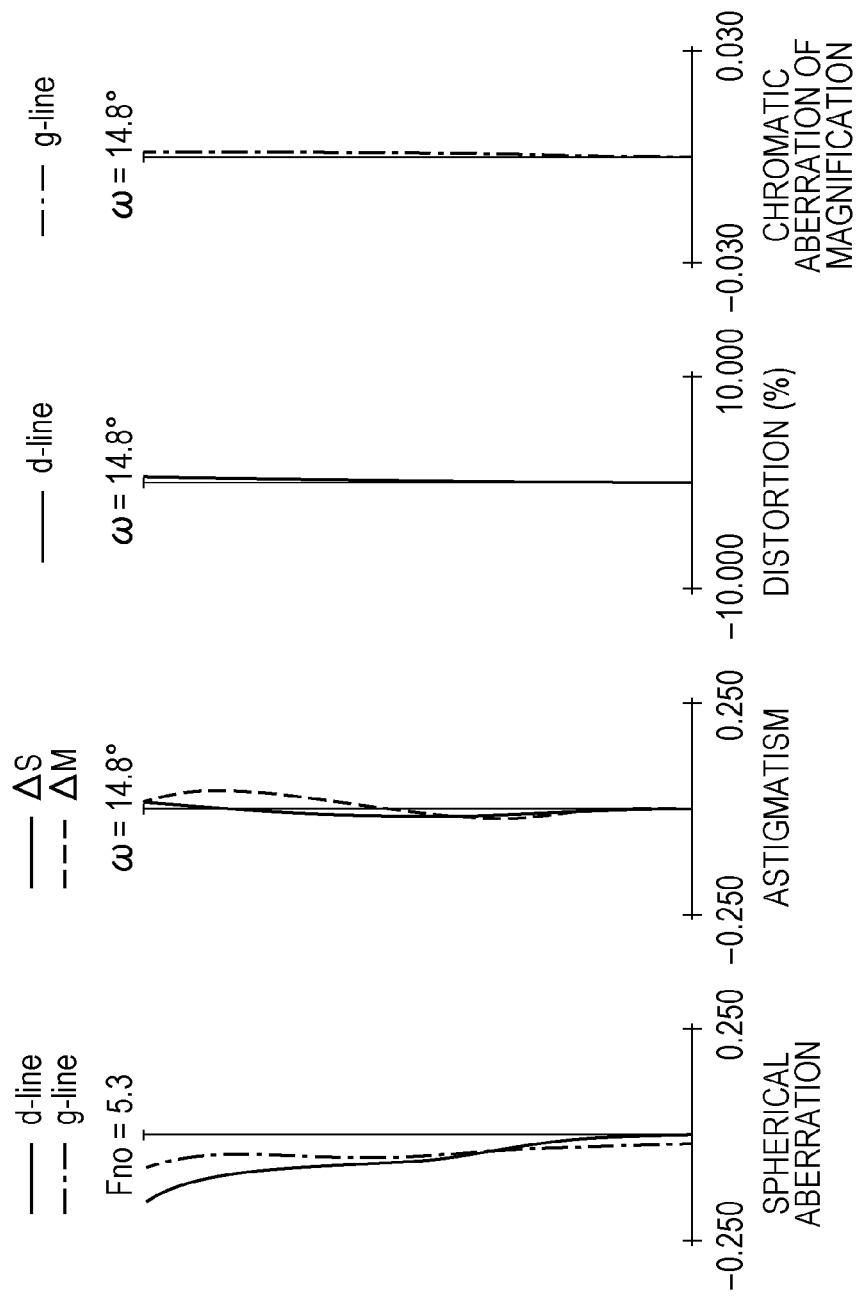
Figure 11C:
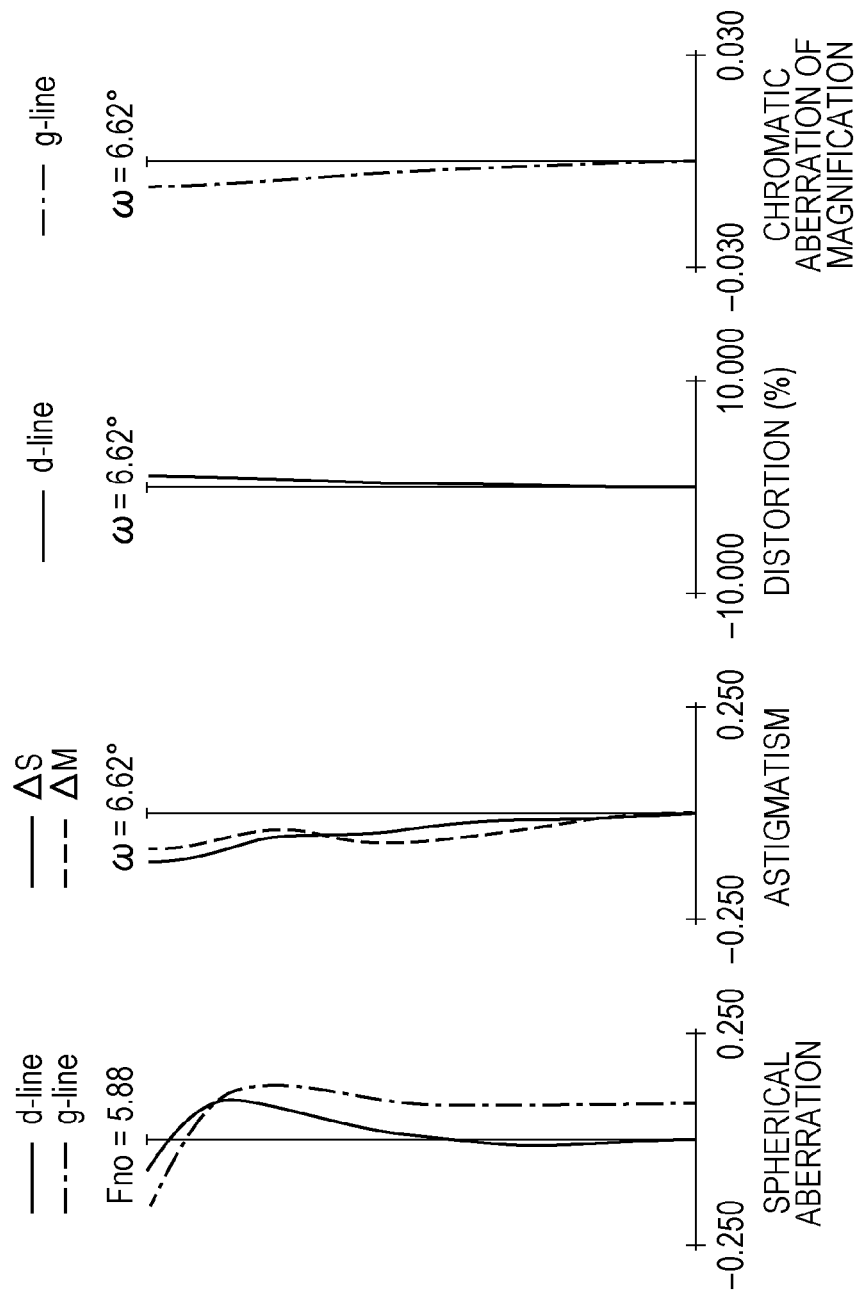
Figure 13:
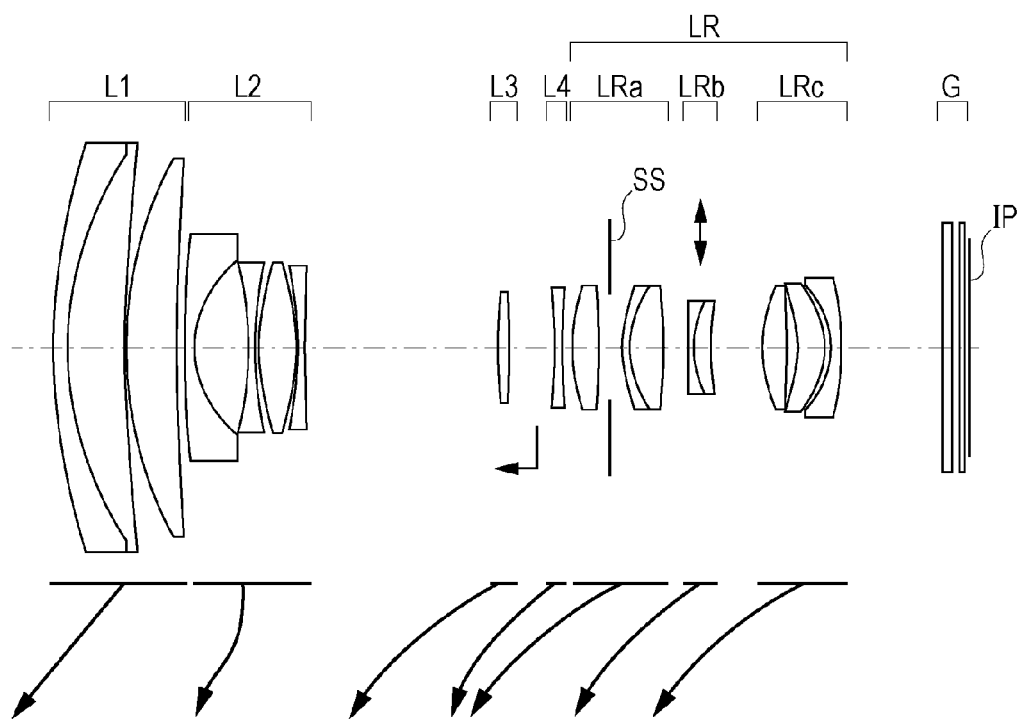
FIG. 13 is a lens sectional view of a zoom lens of a fifth embodiment at the wide-angle end.
Figure 14A:
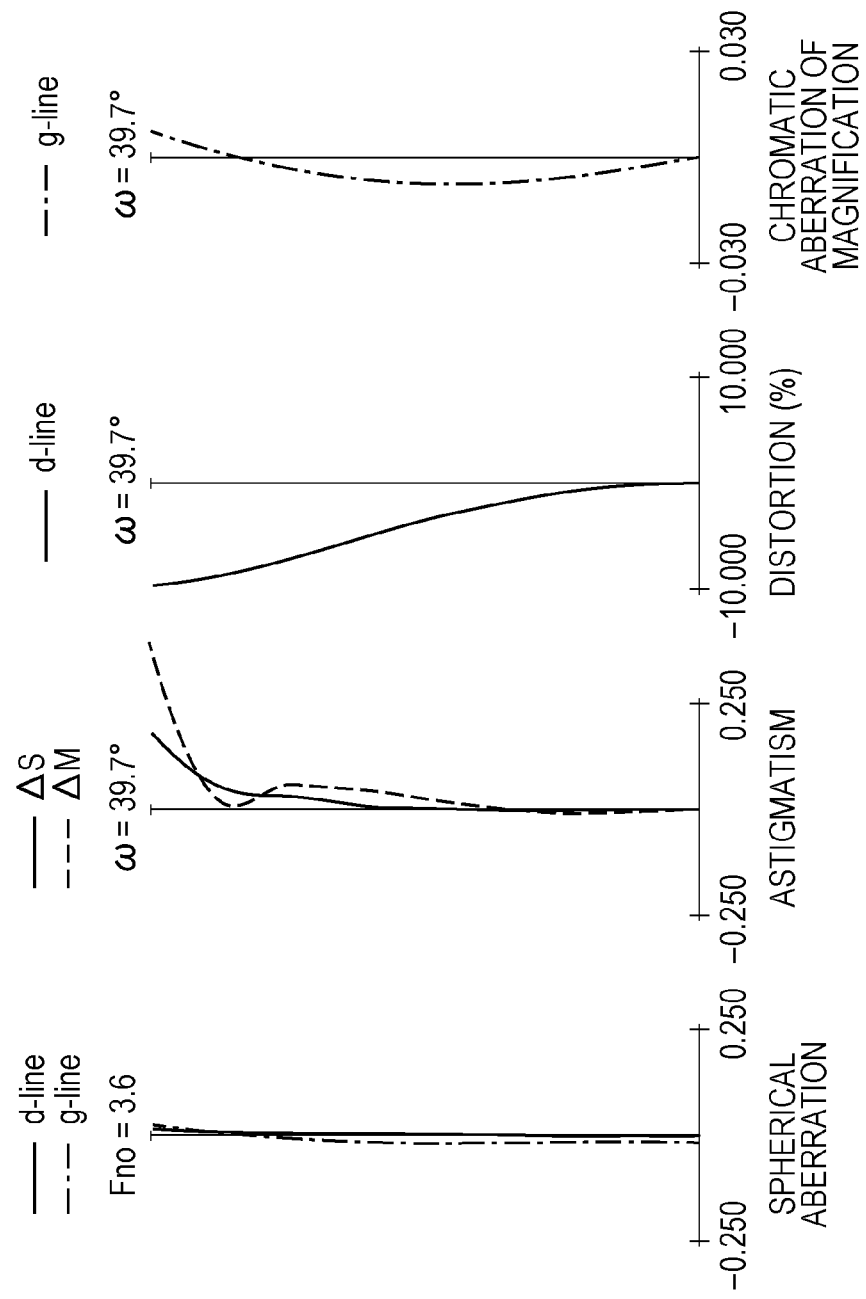
Figure 14C:
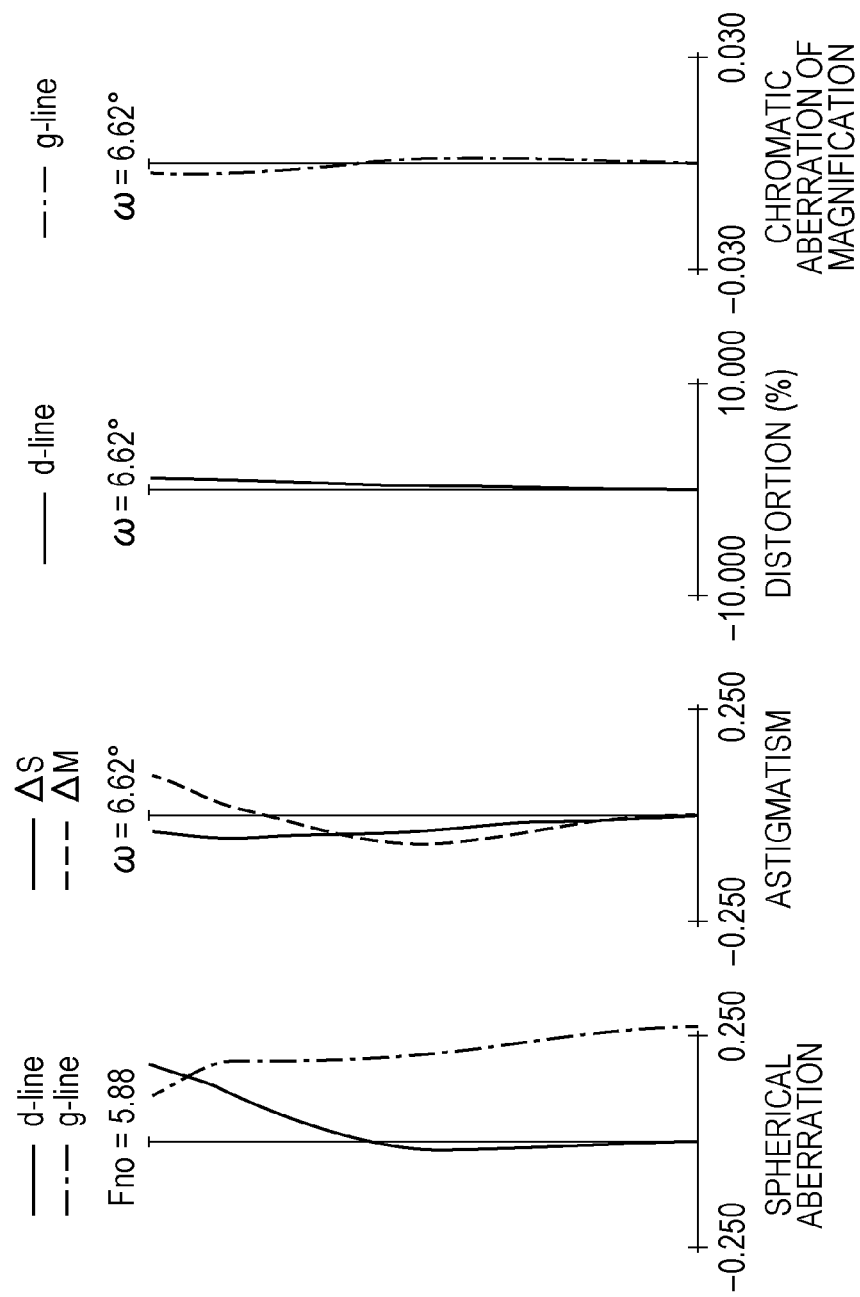
Figure 16:
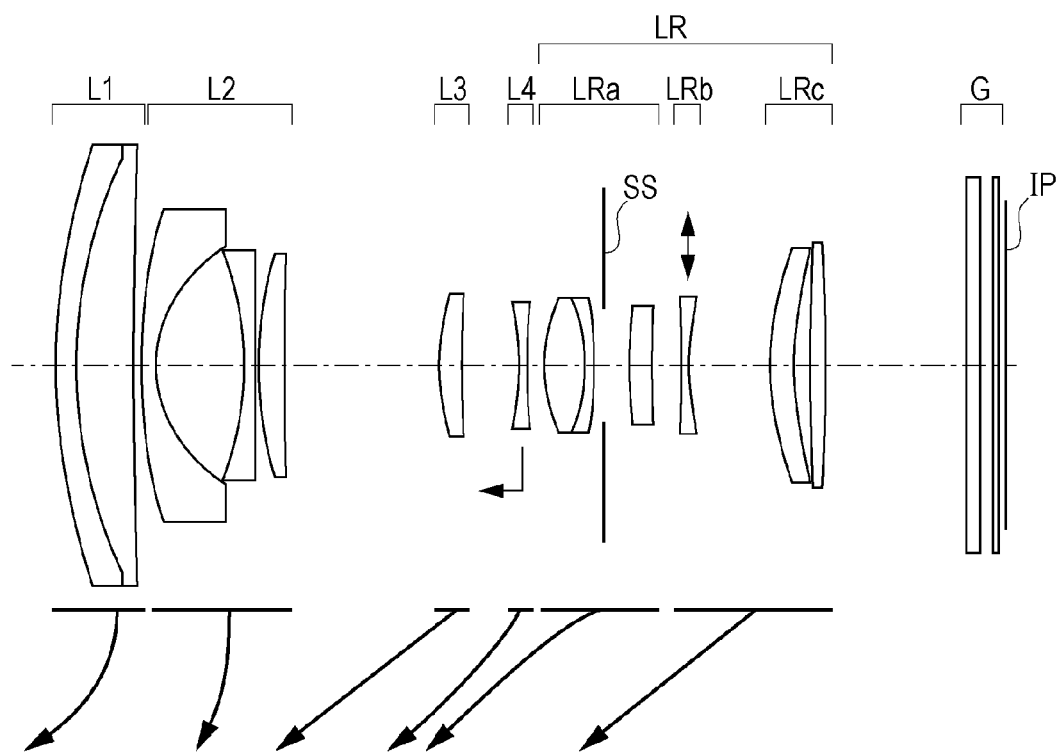
FIG. 16 is a lens sectional view of a zoom lens of a sixth embodiment at the wide-angle end.
Figure 17A:
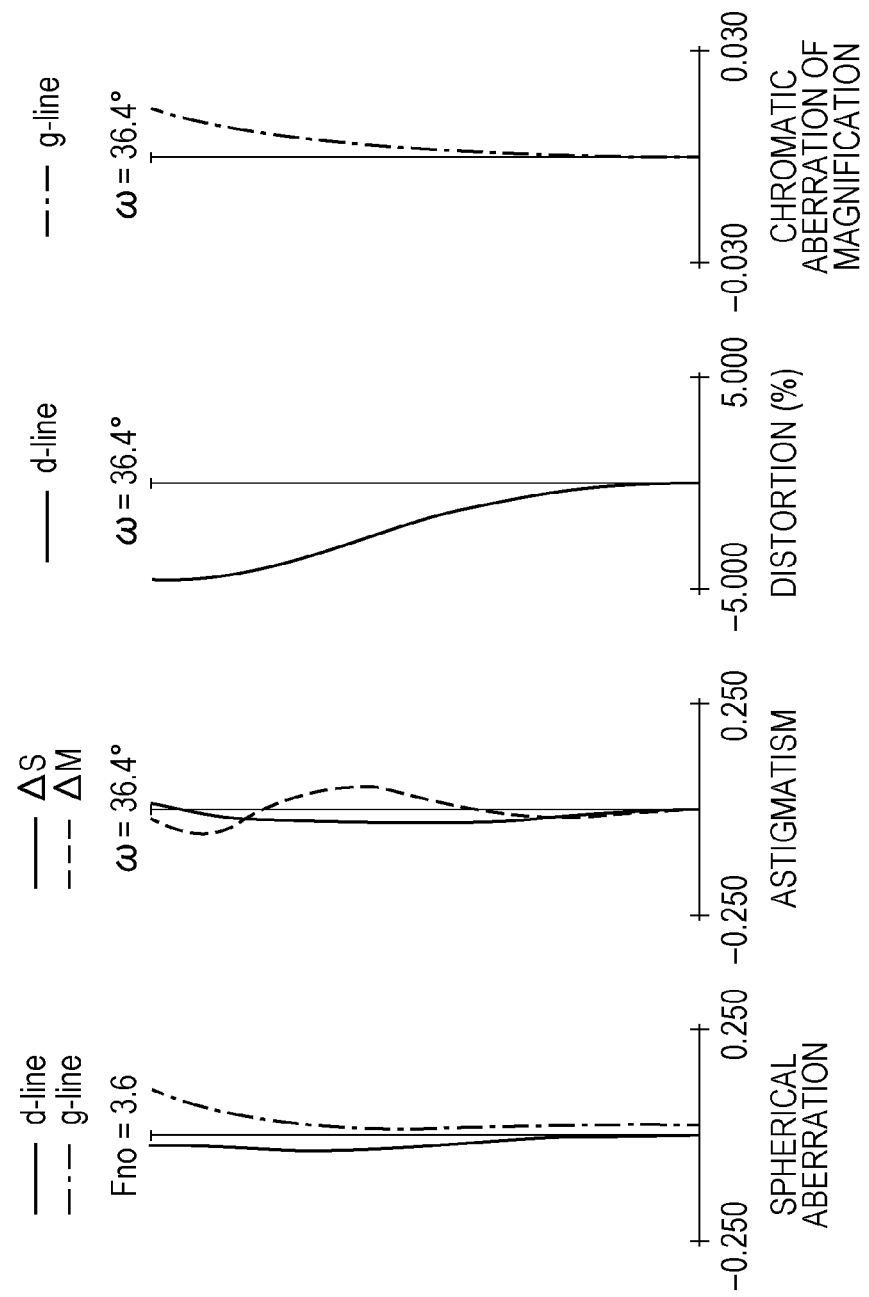
Figure 17B:
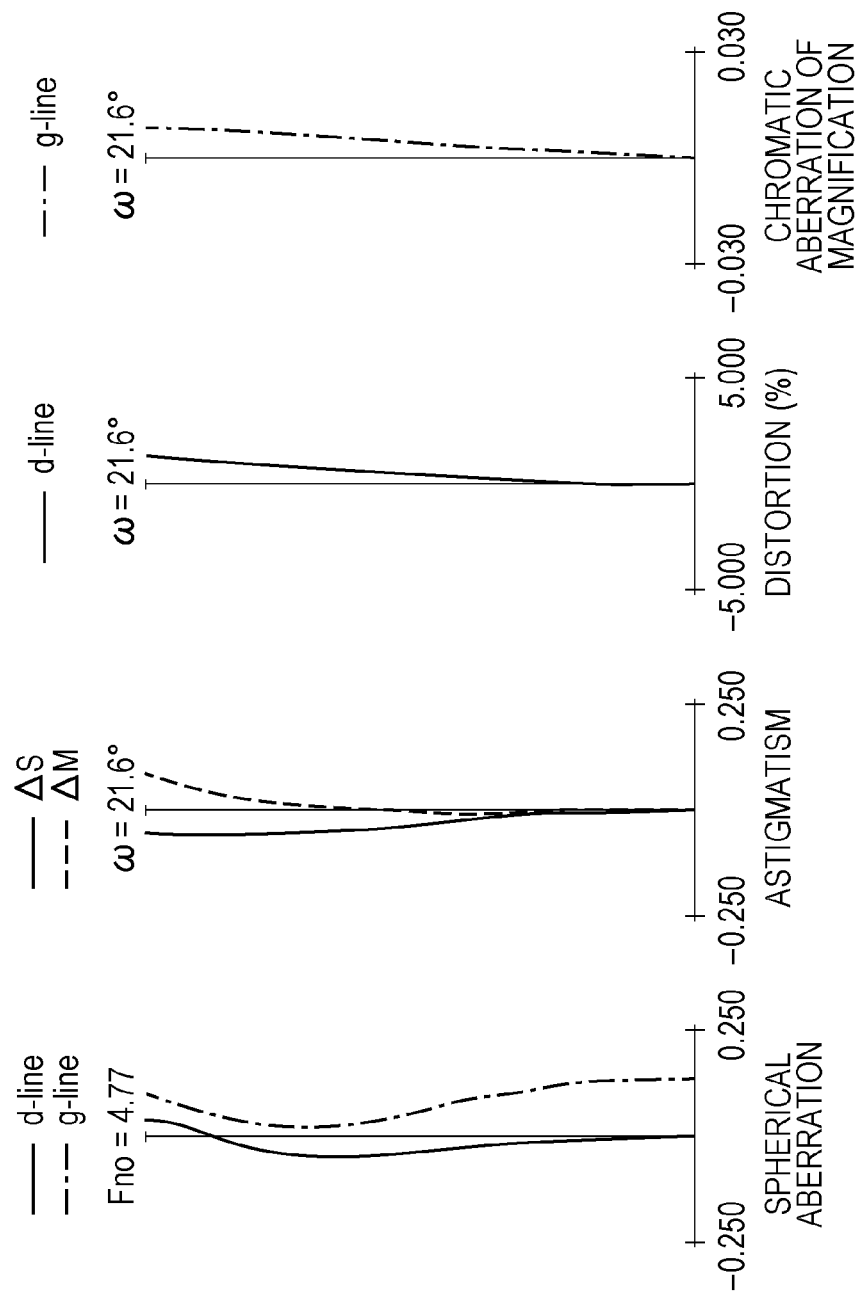
Figure 19:
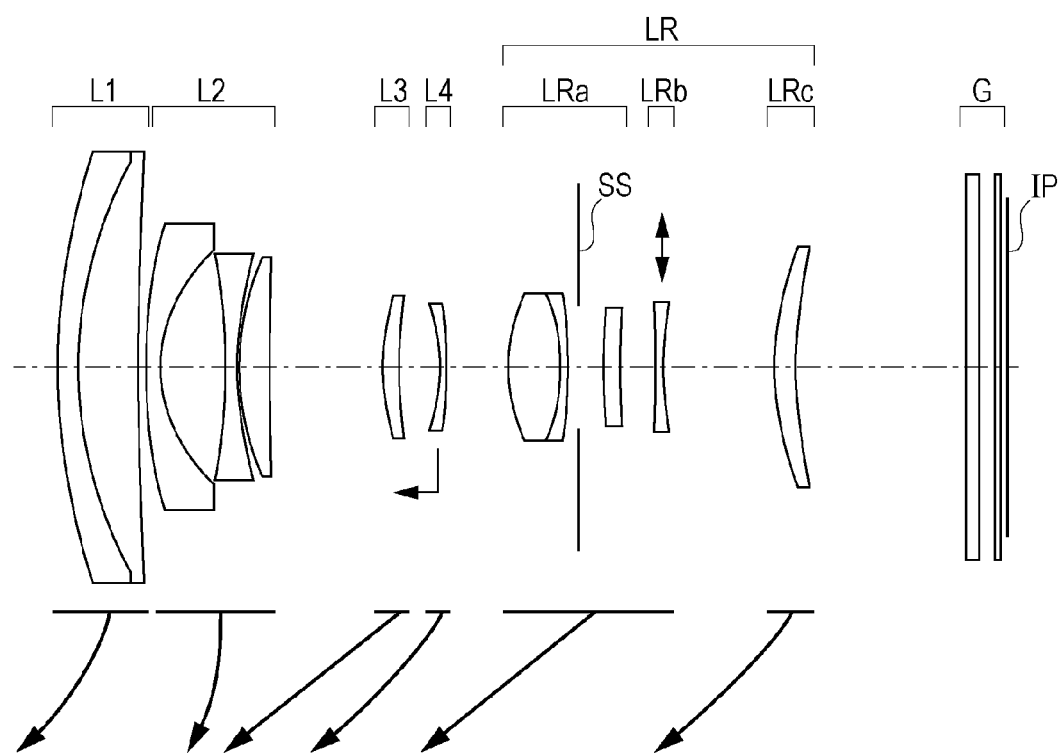
FIG. 19 is a lens sectional view of a zoom lens of a seventh embodiment at the wide-angle end.
Figure 21A:
FIGS. 21A and 21B are lateral aberration diagrams of the zoom lens of the seventh embodiment in a reference state at the telephoto end (no blur correction) and an image stabilizing state (0.3 degree rotational blur correction), respectively.
Figure 21B:
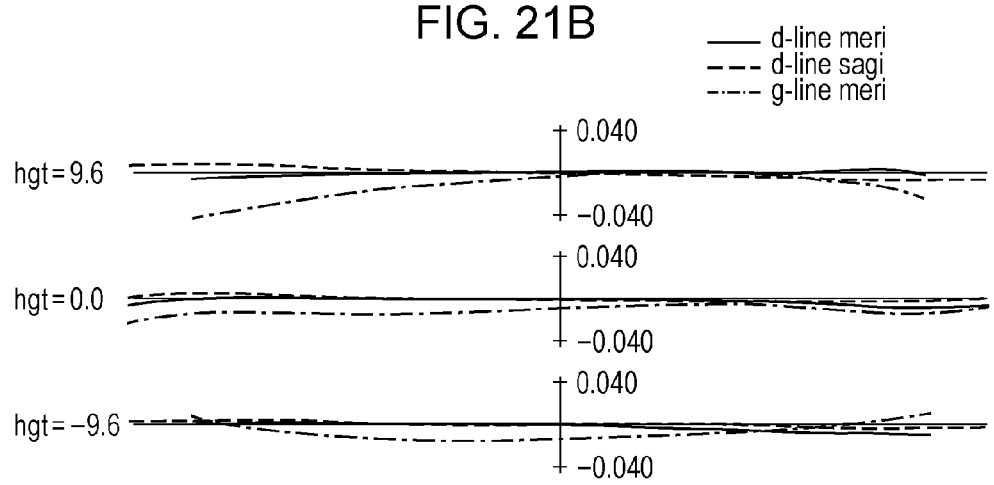

Embodiments of the present invention will be described with reference to the drawings. FIGS. 1, 4, 7, 10, 13, 16, and 19 are sectional views of zoom lenses of first to seventh embodiments at the wide-angle end (short focal length end). FIGS. 2A, 2B, 2C, 5A, 5B, 5C, 8A, 8B, 8C, 11A, 11B, 11C, 14A, 14B, 14C, 17A, 17B, 17C, 20A, 20B, and 20C are longitudinal aberration diagrams of the zoom lenses of the first to seventh embodiments. FIGS. 2A, 5A, 8A, 11A, 14A, 17A, and 20A correspond to the wide-angle end. FIGS. 2B, 5B, 8B, 11B, 14B, 17B, and 20B correspond to a middle zooming position. FIGS. 2C, 5C, 8C, 11C, 14C, 17C, and 20C correspond to the telephoto end (long focal length end). FIGS. 3A, 3B, 6A, 6B, 9A, 9B, 12A, 12B, 15A, 15B, 18A, 18B, 21A, and 21B are lateral aberration diagrams of the zoom lenses of the first to seventh embodiments. FIGS. 3A, 6A, 9A, 12A, 15A, 18A, and 21A correspond to a reference state at the telephoto end (no blur correction) and an image stabilizing state (0.3 degree rotational blur correction). The first to seventh embodiments correspond to Numerical Embodiments 1 to 7 described later.

In the sectional view of each embodiment, the left side is the object side (the front side), the right side is the image side (the rear side), and in order from the object side, a first lens unit L1 of positive refractive power, a second lens unit L2 of negative refractive power, a third lens unit L3 of positive refractive power, a fourth lens unit L4 of negative refractive power, and a rear lens unit LR are shown. The rear lens unit LR includes, in order from the object side to the image side, a first lens subunit LRa of positive refractive power, a second lens subunit LRb of negative refractive power, and a third lens subunit LRc of positive refractive power. The second lens subunit LRb can move so as to have a component in a direction perpendicular to the optical axis, thereby performing image stabilization. The zooming ratio is appropriately shared between the first lens unit L1 and the fourth lens unit L4 having negative refractive power. Thereby, the total lens length is reduced, and the zooming ratio is increased. During zooming, the distance between the first lens unit L1 and the second lens unit L2, the distance between the second lens unit L2 and the third lens unit L3, the distance between the third lens unit L3 and the fourth lens unit L4, and the distance between the fourth lens unit L4 and the first lens subunit LRa each change.

An aperture stop SS is placed between the second lens unit L2 and the third lens subunit LRc, and at least one of the lens units placed on the image side of the second lens unit L2 and on the object side of the aperture stop SS serves as a focus lens unit that moves on the optical axis and performs focusing operation. The height of the off-axis ray is relatively low between the second lens unit L2 and the aperture stop SS. Therefore, by placing a focus lens unit here, the diameter of the focus lens unit can be reduced. Thus, the entire lens barrel including the focus drive mechanism can be downsized. When this zoom lens is used as an exchangeable lens, the focus lens unit can be placed at a position distant from the lens mount portion, and the interference between the focus drive mechanism and the lens mount portion can be avoided.

An optical block G corresponding to an optical filter, a face plate of an image pickup device, or the like is provided. IP denotes an image plane corresponding to the image pickup plane of a solid-state image pickup device (photoelectric conversion device) such as a CCD sensor or a CMOS sensor. The arrows show the movement loci of the lens units during zooming from the wide-angle end to the telephoto end.

In the longitudinal aberration diagrams shown in FIGS. 2A, 2B, 2C, 5A, 5B, 5C, 8A, 8B, 8C, 11A, 11B, 11C, 14A, 14B, 14C, 17A, 17B, 17C, 20A, 20B, and 20C, d and g denote the d-line and the g-line, respectively, and ΔM and ΔS denote the meridional image plane and the sagittal image plane, respectively. The chromatic aberration of magnification is for the g-line. ω denotes the half angle of view, and Fno denotes the F-number. In the lateral aberration diagrams shown in FIGS. 3A, 3B, 6A, 6B, 9A, 9B, 12A, 12B, 15A, 15B, 18A, 18B, 21A, and 21B, d and g denote the d-line and the g-line, respectively, and meri and sagi denote the meridional direction and the sagittal direction, respectively. The chromatic aberration of magnification is for the g-line. hgt denotes the image height.

The zoom lens in an embodiment of the present invention is characterized in that it satisfies the following conditional expressions:

$$0.73 < |f12w|/f3Rw < 2.0 \quad (1), \text{ and}$$

$$0.8 < |fis|/fRt < 2.5 \quad (2),$$

where f12w is the combined focal length of the first lens unit L1 and the second lens unit L2 during focusing on an object at infinity at the wide-angle end, f3Rw is the combined focal length of the third lens unit L3 and the lens units on the image side of the third lens unit L3 during focusing on an object at infinity at the wide-angle end, fis is the focal length of the second lens subunit LRb, fRt is the focal length of the rear lens unit LR during focusing on an object at infinity at the telephoto end.

Conditional expression (1) defines the refractive power arrangement of the zoom lens at the wide-angle end. The zoom lens in an embodiment of the present invention has, at the wide-angle end, a retrofocus-type refractive-power arrangement when a boundary is set between the second lens unit L2 and the third lens unit L3. In the case of retrofocus arrangement, the back focus can be controlled by changing the balance of refractive power between the optical system on the object side and the optical system on the image side. Although reducing the back focus is effective for downsizing the total lens system, extremely reducing the back focus makes the exit pupil distance at the wide-angle end too short. In particular, in an apparatus employing a CCD sensor or a CMOS sensor as an image pickup device, the exit pupil distance needs to be secured in view of the effect of shading. In order to extremely reduce the back focus while securing the exit pupil distance, the rear lens diameter of the optical system needs to be increased. In particular, when the above-described configuration is used as an optical system of an interchangeable lens, the main body of the camera and the mount portion of the interchangeable lens need to be large, and the lens barrel needs to be large. Therefore, by setting the balance of refractive power between the optical system on the object side and the optical system on the image side within an appropriate range, the total zoom lens system can be downsized, and in particular, the total lens length at the wide-angle end can be reduced, while securing the exit pupil distance.

When $|f12w|/f3Rw$ is less the lower limit of conditional expression (1), the ratio of the combined focal length of the first and second lens units at the wide-angle end to the combined focal length of the third lens unit and the lens units on the image side of the third lens unit at the wide-angle end is too small, the back focus is long, and therefore the total lens length is long. When $|f12w|/f3Rw$ is greater than the upper limit, the back focus is too short, and it is difficult to secure the exit pupil distance and the space into which various filters are inserted.

Conditional expression (2) defines the refractive power of the second lens subunit LRb that is placed in the rear lens unit LR and functions as an image stabilizing lens unit. By appropriately defining the refractive power of the second lens subunit LRb, the lens moving distance during image stabilization is reduced while securing the optical performance during image stabilization, and the total zoom lens system including the lens barrel structure is downsized.

When $|fis|/fRt$ is less than the lower limit of conditional expression (2), the refractive power of the second lens subunit LRb is too great compared to the combined focal length of the rear lens unit LR at the telephoto end, and therefore it is difficult to correct the optical performance, particularly the eccentric coma aberration, during image stabilization. When $|fis|/fRt$ is greater than the upper limit, the refractive power of the second lens subunit LRb is too small, the lens moving distance for image stabilization is long, and the total zoom lens system including the lens barrel structure is large.

Owing to the above configuration, a zoom lens that has high optical performance throughout the zoom range including the normal zoom range, that has a short back focus, that is compact, and that is capable of good image stabilization can be obtained.

In each embodiment, preferably, the numerical ranges of conditional expressions (1) and (2) are set as follows:

$$0.77<|f12w|/f3Rw<1.5 \qquad (1a), \text{ and}$$

$$0.9<|fis|/fRt<2.3 \qquad (2a).$$

More preferably, the numerical ranges of conditional expressions (1a) and (2a) are set as follows:

$$0.8<|f12w|/f3Rw<1.1 \qquad (1b), \text{ and}$$

$$1.0<|fis|/fRt<2.0 \qquad (2b).$$

Next, more desirable configurations in some embodiments of the present invention will be described.

In each embodiment, the second lens subunit LRb includes two lenses or less. By reducing the weight of the image stabilizing lens unit, the entire lens barrel can be downsized.

In each embodiment, during zooming from the wide-angle end to the telephoto end, the second lens subunit LRb is moved toward the object side. Owing to this, the increase in diameter of the second lens subunit LRb can be suppressed, and the entire lens barrel including the drive unit can be downsized.

In the first to fifth and seventh embodiments, the third lens unit L3 and the first lens subunit LRa are substantially integrally moved during zooming. Owing to this, the mechanisms for moving these lens units can be integrated, and the entire lens barrel including the drive unit can be downsized.

In the first to sixth embodiments, the third lens unit L3 and the third lens subunit LRc are substantially integrally moved during zooming. Owing to this, the mechanisms for moving these lens units can be integrated, and the entire lens barrel including the drive unit can be downsized.

In the first to fifth embodiments, the first lens subunit LRa and the third lens subunit LRc included in the rear lens unit LR are substantially integrally moved during zooming. Owing to this, the mechanisms for moving these lens units can be integrated, and the entire lens barrel including the drive unit can be downsized.

In each embodiment, focusing from infinity to finite distance is performed by moving the fourth lens unit L4 toward the object side. By using a compact and lightweight lens unit for focusing operation, the focusing mechanism can be downsized, and the focusing speed can be improved.

In each embodiment, all the lens units move during zooming. Since each lens unit moves, the space for movement is effectively used, and both a sufficient amount of zooming and high optical performance can be obtained without increasing the size of the zoom lens.

In each embodiment, during zooming from the wide-angle end to the telephoto end, all the lens units move toward the object side. Owing to this, the total length at the wide-angle end can be reduced. In general, the zoom position when the camera is being carried is desirably the wide-angle end from the viewpoint of snapshooting, and therefore the total length at the wide-angle end is desirably short.

In the zoom lens in an embodiment of the present invention, one or more of the following conditional expressions are desirably satisfied.

The focal length of the total zoom lens system at the wide-angle end will be denoted as fw, and the focal length of the total zoom lens system at the telephoto end will be denoted as ft. The focal length of the first lens unit L1 will be denoted as f1, the focal length of the second lens unit L2 will be denoted as f2, and the focal length of the fourth lens unit L4 will be denoted as f4. The lateral magnification of the second lens subunit LRb during focusing on an object at infinity at the telephoto end will be denoted as βlist, and the combined lateral magnification of the lens units placed on the image side of the second lens subunit LRb during focusing on an object at infinity at the telephoto end will be denoted as βisRt.

The distance between the aperture stop and the object-side surface of the second lens subunit LRb at the telephoto end will be denoted as List. The curvature radius of the object-side surface of the second lens subunit LRb will be denoted as Risf, and the curvature radius of the image-side surface of the second lens subunit LRb will be denoted as Risr. The moving distance of the first lens unit L1 during zooming from the wide-angle end to the telephoto end will be denoted as X1, and the moving distance of the third lens unit L3 during zooming from the wide-angle end to the telephoto end will be denoted as X3. The movement toward the image side is positive.

One or more of the following conditional expressions are desirably satisfied:

$$2.0<f1/fw<8.0 \qquad (3),$$

$$0.5<|f2|/fw<1.2 \qquad (4),$$

$$3.0<|f1/f2|<9.0 \qquad (5),$$

$$-3.5<(1-\beta ist)*\beta isRt<-1.0 \qquad (6),$$

$$0.1 < List/fw < 1.4 \quad (7),$$

$$1.0 < |Risf/Risr| < 10.0 \quad (8),$$

$$0.6 < |f4|/fw < 5.0 \quad (9),$$

$$0.8 < |f12w|/fw < 1.8 \quad (10),$$

$$0.8 < f3Rw/fw < 2.0 \quad (11),$$

$$0.01 < fRt/ft < 1.0 \quad (12), \text{ and}$$

$$0.8 < X1/X3 < 5.0 \quad (13).$$

Next, the technical meaning of each conditional expression will be described.

Conditional expression (3) defines the ratio of the focal length f1 of the first lens unit L1 to the focal length fw of the total lens system at the wide-angle end.

When f1/fw is less than the lower limit of conditional expression (3), the focal length of the first lens unit L1 is too short, and it is particularly difficult to correct the spherical aberration and axial chromatic aberration at the telephoto end. Or the focal length at the wide-angle end is too long, and the image taking field angle at the wide-angle end is narrow. When f1/fw is greater than the upper limit, the focal length of the first lens unit L1 is too long, the moving distance of the lens unit for zooming is long, and the total lens system is large.

Conditional expression (4) defines the ratio of the focal length f2 of the second lens unit L2 to the focal length fw of the total lens system at the wide-angle end.

When |f2|/fw is less than the lower limit of conditional expression (4), the focal length f2 of the second lens unit L2 is too short, and it is particularly difficult to correct the curvature of field and the chromatic aberration of magnification at the wide-angle end. When |f2|/fw is greater than the upper limit, the focal length f2 of the second lens unit L2 is too long, the moving distance of the lens unit for zooming is long, and the total lens system is large.

Conditional expression (5) defines the ratio of the focal length f1 of the first lens unit L1 to the focal length f2 of the second lens unit L2.

When f1/|f2| is greater than the upper limit or less than the lower limit of conditional expression (5), the moving distance of the first lens unit L1 or the second lens unit L2 for zooming is long, and the total lens system is large. Or the focal length of the first lens unit L1 or the second lens unit L2 is too short, and therefore the aberration correction throughout the zoom range is difficult.

Conditional expression (6) defines the lateral magnification βlist of the second lens subunit LRb during focusing on an object at infinity at the telephoto end, and the combined lateral magnification βisRt of the lens units placed on the image side of the second lens subunit LRb during focusing on an object at infinity at the telephoto end. That is, the ratio of the amount of eccentricity of the image stabilizing lens unit to the moving distance of the image (sensitivity) is defined in terms of the lateral magnifications of the units during focusing on an object at infinity at the telephoto end.

When (1−βist)*βisRt is less than the lower limit of conditional expression (6), the vibration control sensitivity of the second lens subunit LRb is too high, and the vibration control is difficult. When (1−βist)*βisRt is greater than the upper limit, the sensitivity of the second lens subunit LRb is too low, the moving distance of the lens unit during image stabilization is long, and therefore the entire lens barrel including the drive unit is large.

Conditional expression (7) defines the ratio of the distance List between the aperture stop and the object-side surface of the second lens subunit LRb at the telephoto end to the focal length fw of the total lens system at the wide-angle end.

When List/fw is less than the lower limit of conditional expression (7), the distance between the image-side surface of the second lens subunit LRb and the aperture stop is too short, and the arrangement of the drive unit is difficult. When List/fw is greater than the upper limit, the distance between the image-side surface of the second lens subunit LRb and the aperture stop is too long, and the diameter of the second lens subunit LRb is large.

Conditional expression (8) defines the curvature radius Risf of the object-side surface of the second lens subunit LRb included in the rear lens unit LR and the curvature radius Risr of the image-side surface thereof.

When |Risf/Risr| is greater than the upper limit of conditional expression (8) or less than the lower limit thereof, it is difficult to correct the fluctuation in aberration, particularly eccentric coma aberration, during image stabilization.

Conditional expression (9) defines the ratio of the focal length f4 of the fourth lens unit L4 to the focal length fw of the total lens system at the wide-angle end.

When |f4|/fw is less than the lower limit of conditional expression (9), the focal length f4 of the fourth lens unit L4 is too short, and it is particularly difficult to correct the fluctuation in spherical aberration and coma aberration during focusing. When |f4|/fw is greater than the upper limit, the focal length f4 of the fourth lens unit L4 is too long, the moving distance for focusing is too long, and therefore the entire lens barrel including the drive unit is large.

Conditional expression (10) defines the ratio of the combined focal length f12w of the first lens unit L1 and the second lens unit L2 at the wide-angle end to the focal length fw of the total lens system at the wide-angle end.

When |f12w|/fw is less than the lower limit of conditional expression (10), the combined focal length is too short, and it is particularly difficult to correct curvature of field and astigmatism. When |f12w|/fw is greater than the upper limit, the combined focal length is too long, and the total lens system is large at the wide-angle end.

Conditional expression (11) defines the ratio of the combined focal length f3Rw of the third lens unit L3 and the lens units on the image side of the third lens unit L3 during focusing on an object at infinity at the wide-angle end, to the focal length fw of the total lens system at the wide-angle end.

When f3Rw/fw is less than the lower limit of conditional expression (11), the combined focal length is too short, and it is particularly difficult to correct spherical aberration and coma aberration. When f3Rw/fw is greater than the upper limit, the combined focal length is too long, and the total lens system is large at the wide-angle end.

Conditional expression (12) defines the ratio of the focal length fRt of the rear lens unit LR during focusing on an object at infinity at the telephoto end, to the focal length fw of the total lens system at the telephoto end.

When fRt/ft is less than the lower limit of conditional expression (12), the combined focal length is too short, and it is particularly difficult to correct spherical aberration and coma aberration. When fRt/ft is greater than the upper limit, the combined focal length is too long, and the total lens system is large at the telephoto end.

Conditional expression (13) defines the ratio of the moving distance X1 of the first lens unit L1 to the moving distance X3 of the third lens unit L3 during zooming from the wide-angle end to the telephoto end. The movement toward the object side is positive.

When X1/X3 is less than the lower limit of conditional expression (13), the moving distance of the third lens unit L3 is too long compared to the moving distance of the first lens unit L1, and the front lens diameter is large. When X1/X3 is greater than the upper limit, the moving distance of the third lens unit L3 is too short compared to the moving distance of the first lens unit L1, and the moving distance of the first lens unit L1 is relatively long. Therefore, the moving lens barrel for the first lens unit L1 is large, and the total lens system including the lens barrel structure is large.

In each embodiment, preferably, the numerical ranges of conditional expressions (3) to (13) are set as follows:

$$3.0 < f1/fw < 7.0 \quad (3a)$$

$$0.65 < |f2|/fw < 1.1 \quad (4a),$$

$$4.0 < f1/|f2| < 8.0 \quad (5a),$$

$$-3.0 < (1-\beta ist)*\beta isRt < -1.2 \quad (6a),$$

$$0.2 < List/fw < 1.2 \quad (7a),$$

$$1.2 < |Risf/Risr| < 8.0 \quad (8a),$$

$$0.7 < |f4|/fw < 4.0 \quad (9a),$$

$$0.9 < |f12w|/fw < 1.5 \quad (10a),$$

$$0.9 < f3Rw/fw < 1.8 \quad (11a),$$

$$0.05 < fRt/ft < 0.5 \quad (12a), \text{ and}$$

$$0.9 < X1/X3 < 4.0 \quad (13a).$$

In each embodiment, more preferably, the numerical ranges of conditional expressions (3a) to (13a) are set as follows:

$$4.0 < f1/fw < 6.0 \quad (3b),$$

$$0.8 < |f2|/fw < 1.0 \quad (4b),$$

$$5.0 < f1/|f2| < 7.0 \quad (5b),$$

$$-2.5 < (1-\beta ist)*\beta isRt < -1.4 \quad (6b),$$

$$0.3 < List/fw < 1.0 \quad (7b),$$

$$1.4 < |Risf/Risr| < 6.0 \quad (8b),$$

$$0.8 < |f4|/fw < 3.0 \quad (9b),$$

$$1.0 < |f12w|/fw < 1.3 \quad (10b),$$

$$1.0 < f3Rw/fw < 1.5 \quad (11b),$$

$$0.1 < fRt/ft < 0.4 \quad (12b), \text{ and}$$

$$1.0 < X1/X3 < 3.0 \quad (13b).$$

Next, the configurations of the zoom lenses of the first to seventh embodiments will be described.

First Embodiment

In the zoom lens of this embodiment, during zooming from the wide-angle end to the telephoto end, the lens units move such that the distance between the first lens unit L1 and the second lens unit L2 and the distance between the third lens unit L3 and the fourth lens unit L4 each increase. In addition, the lens units move such that the distance between the second lens unit L2 and the third lens unit L3 and the distance between the fourth lens unit L4 and the rear lens unit LR decrease. All the lens units move toward the object side. The third lens unit L3 and the rear lens unit LR move integrally. The aperture stop is placed in the first lens subunit LRa and moves integrally with the first lens subunit LRa.

The second lens subunit LRb included in the rear lens unit LR moves so as to have a component in a direction perpendicular to the optical axis, thereby performing image stabilization. Thus, the total lens system including the drive mechanism is downsized.

The inner focus method in which the fourth lens unit L4 is moved on the optical axis for focusing is used. By using the small and lightweight fourth lens unit L4 as a focusing unit, the total lens system including the drive mechanism is downsized and high-speed focusing is achieved.

Second Embodiment

The zoom type, image stabilizing method, and focusing method of this embodiment are the same as those of the first embodiment. This embodiment differs from the first embodiment in the lens configuration and shape in each lens unit.

Third Embodiment

This embodiment is a seven-unit zoom lens having, in order from the object side, positive, negative, positive, negative, positive, negative, and positive refractive power. The rear lens unit LR includes a fifth lens unit (first lens subunit) LRa having positive refractive power, a sixth lens unit (second lens subunit) LRb having negative refractive power, and a seventh lens unit (third lens subunit) LRc having positive refractive power. Owing to this configuration, this zoom lens has a wide angle of view and a high zooming ratio.

In this embodiment, during zooming from the wide-angle end to the telephoto end, the lens units move such that the distance between the first lens unit L1 and the second lens unit L2, the distance between the third lens unit L3 and the fourth lens unit L4, and the distance between the fifth lens unit LRa and the sixth lens unit LRb each increase. In addition, the lens units move such that the distance between the second lens unit L2 and the third lens unit L3, the distance between the fourth lens unit L4 and the fifth lens unit LRa, and the distance between the sixth lens unit LRb and the seventh lens unit LRc decrease. All the lens units move toward the object side. The third lens unit L3, the fifth lens unit LRa, and the seventh lens unit LRc move integrally. The aperture stop is placed on the object side of the fifth lens unit LRa and moves integrally with the fifth lens unit LRa. The image stabilizing method and focusing method of this embodiment are the same as those of the first embodiment.

Fourth Embodiment

The zoom type and focusing method of this embodiment are the same as those of the third embodiment. This embodiment differs from the third embodiment in that the aperture stop is placed in the fifth lens unit LRa, the angle of view at the wide-angle end is increased, and the zooming ratio is changed.

Fifth Embodiment

The zoom type, image stabilizing method, and focusing method of this embodiment are the same as those of the fourth embodiment. This embodiment differs from the fourth embodiment in the lens configuration and shape in each lens unit.

Sixth Embodiment

This embodiment is a six-unit zoom lens having, in order from the object side, positive, negative, positive, negative, positive, and negative refractive power. The rear lens unit LR includes a fifth lens unit (first lens subunit) LRa having positive refractive power, and a sixth lens unit including a second lens subunit LRb having negative refractive power and a third lens subunit LRc having positive refractive power. Owing to this configuration, the degree of freedom of aberration correction at the middle zooming position is secured.

In this embodiment, during zooming from the wide-angle end to the telephoto end, the lens units move such that the distance between the first lens unit L1 and the second lens unit L2 and the distance between the third lens unit L3 and the fourth lens unit L4 each increase. In addition, the lens units move such that the distance between the second lens unit L2 and the third lens unit L3, the distance between the fourth lens unit L4 and the fifth lens unit LRa, and the distance between the fifth lens unit LRa and the sixth lens unit decrease. All the lens units move toward the object side. The third lens unit L3 and the sixth lens unit L6 move integrally. The aperture stop is placed in the fifth lens unit LRa and moves integrally with the fifth lens unit LRa. The image stabilizing method and focusing method of this embodiment are the same as those of the first embodiment.

Seventh Embodiment

This embodiment is a six-unit zoom lens having, in order from the object side, positive, negative, positive, negative, positive, and positive refractive power. The rear lens unit LR includes a fifth lens unit including a first lens subunit LRa having positive refractive power and a second lens subunit LRb having negative refractive power, and a sixth lens unit (third lens subunit) LRc having positive refractive power. Owing to this configuration, the degree of freedom of aberration correction at the middle zooming position is secured.

In this embodiment, during zooming from the wide-angle end to the telephoto end, the lens units move such that the distance between the first lens unit L1 and the second lens unit L2, the distance between the third lens unit L3 and the fourth lens unit L4, and the distance between the fifth lens unit and the sixth lens unit LRc each increase. In addition, the lens units move such that the distance between the second lens unit L2 and the third lens unit L3, and the distance between the fourth lens unit L4 and the fifth lens unit decrease. All the lens units move toward the object side. The third lens unit L3 and the fifth lens unit move integrally. The aperture stop is placed in the fifth lens unit and moves integrally with the fifth lens unit. The image stabilizing method and focusing method of this embodiment are the same as those of the first embodiment.

Although embodiments of the present invention have been described, the present invention is not limited to the above-described embodiments, and various modifications and changes may be made without departing from the spirit of the present invention. For example, in the zoom lens of each embodiment, in order to control the fluctuation in F-number during zooming, the aperture diameter may be controlled according to the zooming position. The distortion remaining in the optical system may be electrically corrected (correction by image processing).

The zoom lenses of the first to seventh embodiments can be used in an optical apparatus such as an interchangeable lens, a still camera, a video camera, or a digital still camera.

The following are Numerical Embodiments 1 to 7 corresponding to the first to seventh embodiments. In each numerical embodiment, surface number "i" is counted from the object side; ri denotes the curvature radius of the i-th optical surface (i-th surface); di denotes the axial distance between the i-th surface and the (i+1)th surface; and ndi and vdi denote the refractive index and the Abbe number, respectively, of the material of the i-th optical member for the d-line. f denotes the focal length, Fno denotes the F-number, and ω denotes the half angle of view.

The Abbe number vd is defined by the following expression:

$$vd = (Nd-1)/(NF-NC)$$

where Nd is the refractive index for the Fraunhofer's d-line (587.6 nm), NF is the refractive index for the Fraunhofer's F-line (486.1 nm), and NC is the refractive index for the Fraunhofer's C-line (656.3 nm). The aspherical shape is defined by the following expression:

$$x = (h^2/r)/[1+\{1-(1+K)\times(h/r)^2\}^{1/2}] + A4 \times h^4 + A6 \times h^6 + A8 \times h^8 + A10 \times h^{10}$$

where the direction in which light travels is positive, x is the amount of displacement from the surface vertex in the optical axis direction, h is the height from the optical axis in a direction perpendicular to the optical axis, r is a paraxial curvature radius, K is a conic constant, and A4, A6, A8, and A10 are aspherical coefficients.

"E±XX" in numerical values means "$\times 10^{\pm XX}$."

Table 1 shows the relationship between the above-described conditional expressions and numerical embodiments. Table 2 shows parameters used in the conditional expressions.

(Numerical Embodiment 1)
unit mm surface data

| surface number | r | d | nd | vd | effective diameter |
|---|---|---|---|---|---|
| 1 | 46.669 | 1.70 | 1.84666 | 23.9 | 34.95 |
| 2 | 35.524 | 4.60 | 1.69680 | 55.5 | 32.80 |
| 3 | 204.820 | (variable) | | | 32.07 |
| 4 | 34.378 | 1.20 | 1.83481 | 42.7 | 24.23 |
| 5 | 10.658 | 6.37 | | | 17.97 |
| 6* | −54.819 | 1.00 | 1.85135 | 40.1 | 17.47 |
| 7 | 40.459 | 0.15 | | | 16.98 |
| 8 | 21.274 | 2.60 | 1.92286 | 18.9 | 17.00 |
| 9 | 74.846 | (variable) | | | 16.48 |
| 10 | 16.794 | 1.40 | 1.77250 | 49.6 | 9.65 |
| 11 | 36.819 | (variable) | | | 9.47 |
| 12 | −16.363 | 0.55 | 1.88300 | 40.8 | 9.40 |
| 13 | −55.623 | (variable) | | | 9.67 |
| 14 | 14.081 | 3.80 | 1.69680 | 55.5 | 10.95 |
| 15 | −14.081 | 0.80 | 1.84666 | 23.9 | 10.70 |
| 16 | −24.638 | 0.80 | | | 10.61 |
| 17 (stop) | ∞ | 2.00 | | | 9.86 |
| 18* | 23.987 | 2.00 | 1.58313 | 59.4 | 9.09 |
| 19* | 82.591 | (variable) | | | 9.36 |
| 20 | −42.910 | 0.60 | 1.90366 | 31.3 | 10.05 |
| 21 | 26.991 | (variable) | | | 10.43 |
| 22 | 25.069 | 2.00 | 1.52996 | 55.8 | 17.50 |
| 23* | 25.588 | 1.99 | | | 18.05 |
| 24 | −201.896 | 2.00 | 1.84666 | 23.9 | 18.31 |
| 25 | −43.203 | (variable) | | | 18.90 |
| 26 | ∞ | 1.21 | 1.51633 | 64.1 | 30.00 |
| 27 | ∞ | 1.10 | | | 30.00 |
| 28 | ∞ | 0.50 | 1.51633 | 64.1 | 30.00 |
| 29 | ∞ | | | | 30.00 |
| image plane | ∞ | | | | |

-continued (Numerical Embodiment 1)
unit mm aspherical surface data

6th surface

K = 2.03284e+001   A4 = 1.34534e-005   A6 = 9.74836e-008
A8 = -5.46269e-010  A10 = 7.48620e-012

18th surface

K = -4.02860e+000   A4 = -1.06804e-004   A6 = -4.99512e-006
A8 = -1.13675e-008  A10 = -3.18466e-009  A12 = 6.43346e-011

19th surface

K = 0.00000e+000    A4 = 1.40820e-004    A6 = -3.17915e-006
A8 = -8.57069e-008  A10 = 1.14883e-009   A12 = -1.17453e-012

23rd surface

K = -9.67257e-001   A4 = -2.37994e-005   A6 = 1.12104e-007
A8 = 5.00265e-011 various data
zoom ratio 2.87

|  | wide-angle | middle | telephoto |
|---|---|---|---|
| focal length | 18.58 | 27.82 | 53.36 |
| F-number | 3.60 | 4.27 | 5.69 |
| angle of view | 36.33 | 26.15 | 14.36 |
| image height | 13.66 | 13.66 | 13.66 |
| total lens length | 78.22 | 86.23 | 104.79 |
| BF | 0.50 | 0.50 | 0.50 |
| d3 | 0.60 | 8.07 | 20.20 |
| d9 | 12.88 | 7.33 | 0.54 |
| d11 | 3.21 | 3.97 | 4.67 |
| d13 | 2.48 | 1.71 | 1.02 |
| d19 | 2.80 | 2.80 | 2.80 |
| d21 | 6.00 | 6.00 | 6.00 |
| d25 | 11.38 | 17.48 | 30.69 |
| entrance pupil position | 21.38 | 33.08 | 58.11 |
| exit pupil position | -32.82 | -38.91 | -52.13 |
| front principal point position | 29.60 | 41.26 | 57.37 |
| rear principal point position | -18.08 | -27.32 | -52.86 | zoom lens unit data

| unit | leading surface | focal length | lens structure length | front principal point position | rear principal point position |
|---|---|---|---|---|---|
| L1 | 1 | 92.79 | 6.30 | -1.51 | -5.07 |
| L2 | 4 | -16.69 | 11.32 | 1.60 | -7.22 |
| L3 | 10 | 38.79 | 1.40 | -0.64 | -1.41 |
| L4 | 12 | -26.43 | 0.55 | -0.12 | -0.42 |
| LRa | 14 | 12.13 | 9.40 | 1.85 | -5.26 |
| LRb | 20 | -18.26 | 0.60 | 0.19 | -0.12 |
| LRc | 22 | 62.45 | 5.99 | 2.91 | -1.64 |
| G | 26 | ∞ | 2.81 | 1.11 | -1.11 | single lens data

| lens | leading surface | focal length |
|---|---|---|
| 1 | 1 | -188.91 |
| 2 | 2 | 61.00 |
| 3 | 4 | -18.94 |
| 4 | 6 | -27.21 |
| 5 | 8 | 31.47 |
| 6 | 10 | 38.79 |
| 7 | 12 | -26.43 |
| 8 | 14 | 10.70 |
| 9 | 15 | -40.21 |
| 10 | 18 | 57.25 |
| 11 | 20 | -18.26 |
| 12 | 22 | 998.48 |
| 13 | 24 | 64.55 |
| 14 | 26 | 0.00 |
| 15 | 28 | 0.00 |

The amount of eccentricity from the optical axis of the LRb unit for correcting 0.3 degree rotational blur of the total optical system at the telephoto end: 0.13 mm (Numerical Embodiment 2)
unit mm surface data

| surface number | r | d | nd | vd | effective diameter |
|---|---|---|---|---|---|
| 1 | 50.562 | 1.70 | 1.84666 | 23.9 | 33.22 |
| 2 | 33.313 | 4.76 | 1.71300 | 53.9 | 31.48 |
| 3 | 247.631 | (variable) |  |  | 30.74 |
| 4 | 44.999 | 1.20 | 1.88300 | 40.8 | 20.52 |
| 5 | 11.109 | 5.16 |  |  | 16.25 |
| 6 | -38.138 | 1.00 | 1.83481 | 42.7 | 15.79 |
| 7 | 49.133 | 0.10 |  |  | 15.55 |
| 8 | 23.786 | 2.19 | 1.94595 | 18.0 | 15.62 |
| 9 | 182.183 | (variable) |  |  | 15.33 |
| 10 | 19.827 | 1.35 | 1.77250 | 49.6 | 10.33 |
| 11 | 64.764 | (variable) |  |  | 9.90 |
| 12 | -15.116 | 0.55 | 1.83400 | 37.2 | 9.26 |
| 13 | -39.003 | (variable) |  |  | 9.58 |
| 14 | 13.334 | 4.28 | 1.69680 | 55.5 | 10.89 |
| 15 | -14.349 | 0.60 | 1.84666 | 23.9 | 10.49 |
| 16 | -27.315 | 0.80 |  |  | 10.37 |
| 17 (stop) | ∞ | 2.00 |  |  | 9.64 |
| 18* | 42.954 | 1.38 | 1.58313 | 59.4 | 8.59 |
| 19* | 169.626 | (variable) |  |  | 8.44 |
| 20 | -55.761 | 0.60 | 1.90366 | 31.3 | 9.58 |
| 21 | 25.575 | (variable) |  |  | 9.92 |
| 22 | 41.137 | 2.00 | 1.52996 | 55.8 | 15.21 |
| 23* | 53.391 | 0.94 |  |  | 15.99 |
| 24 | -481.473 | 1.39 | 1.84666 | 23.9 | 16.33 |
| 25 | -51.207 | (variable) |  |  | 16.67 |
| 26 | ∞ | 1.21 | 1.51633 | 64.1 | 30.00 |
| 27 | ∞ | 1.10 |  |  | 30.00 |
| 28 | ∞ | 0.50 | 1.51633 | 64.1 | 30.00 |
| 29 | ∞ |  |  |  | 30.00 |
| image plane | ∞ |  |  |  |  | aspherical surface data

18th surface

K = 1.17889e+001   A4 = -1.33689e-004   A6 = -2.50949e-006
A8 = -6.04062e-008  A10 = -1.74258e-009  A12 = 7.19571e-011

19th surface

K = 0.00000e+000   A4 = 1.99647e-004    A6 = -2.33047e-006
A8 = 7.26332e-008  A10 = -4.80612e-009  A12 = 9.66776e-011

23rd surface

K = -1.30942e+001  A4 = -2.56689e-005   A6 = -6.31439e-009
A8 = 5.41738e-010  A10 = -3.94493e-012 various data
zoom ratio 2.88

|  | wide-angle | middle | telephoto |
|---|---|---|---|
| focal length | 18.50 | 33.53 | 53.35 |
| F-number | 3.60 | 4.72 | 5.88 |
| angle of view | 36.44 | 22.16 | 14.36 |
| image height | 13.66 | 13.66 | 13.66 |
| total lens length | 74.10 | 89.70 | 107.21 |
| BF | 0.50 | 0.50 | 0.50 |
| d3 | 0.64 | 12.33 | 22.65 |
| d9 | 9.68 | 3.51 | 0.62 |
| d11 | 3.31 | 4.90 | 6.07 |
| d13 | 3.82 | 2.24 | 1.06 |
| d19 | 3.60 | 3.60 | 3.60 |
| d21 | 5.11 | 5.11 | 5.11 |
| d25 | 12.62 | 22.70 | 32.77 |
| entrance pupil position | 19.47 | 38.24 | 61.11 |
| exit pupil position | -31.37 | -41.44 | -51.52 |

(Numerical Embodiment 2)
unit mm

| | | | |
|---|---|---|---|
| front principal point position | 27.23 | 44.97 | 59.74 |
| rear principal point position | −18.00 | −33.03 | −52.85 | zoom lens unit data

| unit | leading surface | focal length | lens structure length | front principal point position | rear principal point position |
|---|---|---|---|---|---|
| L1 | 1 | 99.38 | 6.46 | −1.43 | −5.07 |
| L2 | 4 | −15.74 | 9.65 | 1.05 | −6.50 |
| L3 | 10 | 36.51 | 1.35 | −0.33 | −1.08 |
| L4 | 12 | −29.91 | 0.55 | −0.19 | −0.49 |
| LRa | 14 | 13.06 | 9.06 | 1.50 | −5.35 |
| LRb | 20 | −19.34 | 0.60 | 0.22 | −0.10 |
| LRc | 22 | 56.85 | 4.34 | 1.89 | −1.19 |
| G | 26 | ∞ | 2.81 | 1.11 | −1.11 | single lens data

| lens | leading surface | focal length |
|---|---|---|
| 1 | 1 | −120.80 |
| 2 | 2 | 53.49 |
| 3 | 4 | −16.99 |
| 4 | 6 | −25.59 |
| 5 | 8 | 28.73 |
| 6 | 10 | 36.51 |
| 7 | 12 | −29.91 |
| 8 | 14 | 10.59 |
| 9 | 15 | −36.48 |
| 10 | 18 | 98.25 |
| 11 | 20 | −19.34 |
| 12 | 22 | 320.12 |
| 13 | 24 | 67.58 |
| 14 | 26 | 0.00 |
| 15 | 28 | 0.00 |

The amount of eccentricity from the optical axis of the LRb unit for correcting 0.3 degree rotational blur of the total optical system at the telephoto end: 0.14 mm (Numerical Embodiment 3)
unit mm surface data

| surface number | r | d | nd | vd | effective diameter |
|---|---|---|---|---|---|
| 1 | 97.715 | 2.00 | 2.00069 | 25.5 | 53.09 |
| 2 | 66.894 | 6.47 | 1.55332 | 71.7 | 51.79 |
| 3 | 1868.666 | 0.15 | | | 51.45 |
| 4 | 55.219 | 5.23 | 1.49700 | 81.5 | 49.38 |
| 5 | 168.762 | (variable) | | | 48.72 |
| 6 | 110.207 | 1.20 | 1.83481 | 42.7 | 25.12 |
| 7 | 16.200 | 0.15 | 1.51640 | 52.2 | 20.29 |
| 8* | 16.748 | 6.13 | | | 20.25 |
| 9 | −28.249 | 0.90 | 1.80400 | 46.6 | 19.39 |
| 10 | −321.109 | 0.15 | | | 19.24 |
| 11 | 61.575 | 2.71 | 1.95906 | 17.5 | 19.07 |
| 12 | −57.032 | 0.28 | | | 18.80 |
| 13 | −46.554 | 0.85 | 1.88300 | 40.8 | 18.70 |
| 14 | 586.779 | (variable) | | | 18.29 |
| 15 | 32.797 | 1.82 | 1.83481 | 42.7 | 13.27 |
| 16 | −174.519 | (variable) | | | 13.27 |
| 17 | −30.455 | 0.80 | 1.80000 | 29.8 | 12.77 |
| 18 | 86.564 | (variable) | | | 13.04 |
| 19 (stop) | ∞ | 1.20 | | | 13.48 |
| 20* | 22.181 | 3.79 | 1.58313 | 59.4 | 14.44 |
| 21 | −48.174 | 0.56 | | | 14.48 |
| 22 | 29.122 | 0.90 | 1.84666 | 23.8 | 14.18 |
| 23 | 16.099 | 4.22 | 1.48749 | 70.2 | 13.70 |
| 24 | −76.048 | (variable) | | | 13.66 |
| 25 | 170.102 | 0.70 | 1.91082 | 35.3 | 13.90 |
| 26 | 12.475 | 2.72 | 1.84666 | 23.8 | 13.86 |
| 27 | 32.932 | (variable) | | | 13.89 |
| 28 | 33.868 | 1.68 | 1.60562 | 43.7 | 16.37 |
| 29 | 138.420 | 0.10 | | | 16.44 |
| 30 | 25.041 | 2.31 | 1.58144 | 40.8 | 16.68 |
| 31 | 149.368 | 2.24 | | | 16.52 |
| 32* | −23.824 | 1.20 | 1.85135 | 40.1 | 16.44 |
| 33 | −106.850 | (variable) | | | 17.04 |
| 34 | ∞ | 1.21 | 1.51633 | 64.1 | 30.00 |
| 35 | ∞ | 1.10 | | | 30.00 |
| 36 | ∞ | 0.50 | 1.51633 | 64.1 | 30.00 |
| 37 | ∞ | | | | 30.00 |
| image plane | ∞ | | | | | aspherical surface data

8th surface

K = 0.00000e+000    A4 = 4.01170e−008    A6 = 3.71896e−008
A8 = −3.23706e−010  A10 = 3.72882e−012

20th surface

K = 0.00000e+000    A4 = −2.49915e−005   A6 = 9.28698e−009
A8 = −5.98683e−011

32nd surface

K = 0.00000e+000    A4 = −9.78807e−006   A6 = 6.81962e−008
A8 = −6.75998e−010  A10 = 5.63904e−012 various data
zoom ratio 10.39

| | wide-angle | middle | telephoto |
|---|---|---|---|
| focal length | 18.60 | 60.12 | 193.23 |
| F-number | 3.55 | 5.59 | 6.60 |
| angle of view | 36.29 | 12.80 | 4.04 |
| image height | 13.66 | 13.66 | 13.66 |
| total lens length | 118.58 | 151.48 | 184.39 |
| BF | 0.50 | 0.50 | 0.50 |
| d5 | 1.20 | 28.26 | 59.61 |
| d14 | 25.55 | 9.14 | 0.70 |
| d16 | 4.42 | 6.21 | 8.49 |
| d18 | 5.39 | 3.59 | 1.31 |
| d24 | 5.55 | 6.69 | 8.07 |
| d27 | 5.42 | 4.28 | 2.90 |
| d33 | 17.27 | 39.53 | 49.52 |
| entrance pupil position | 30.91 | 91.09 | 304.85 |
| exit pupil position | −39.79 | −61.44 | −70.68 |
| front principal point position | 40.92 | 92.86 | −26.49 |
| rear principal point position | −18.10 | −59.62 | −192.73 | zoom lens unit data

| unit | leading surface | focal length | lens structure length | front principal point position | rear principal point position |
|---|---|---|---|---|---|
| L1 | 1 | 106.87 | 13.86 | 1.52 | −7.28 |
| L2 | 6 | −16.62 | 12.37 | 2.27 | −6.97 |
| L3 | 15 | 33.20 | 1.82 | 0.16 | −0.84 |
| L4 | 17 | −28.08 | 0.80 | 0.12 | −0.33 |
| LRa | 19 | 20.25 | 10.68 | 2.79 | −4.90 |
| LRb | 25 | −39.32 | 3.42 | 1.94 | 0.09 |
| LRc | 28 | 110.90 | 7.53 | −12.73 | −16.39 |
| G | 34 | ∞ | 2.81 | 1.11 | −1.11 | single lens data

| lens | leading surface | focal length |
|---|---|---|
| 1 | 1 | −219.05 |
| 2 | 2 | 125.22 |
| 3 | 4 | 162.65 |

(Numerical Embodiment 3)
unit mm

| | | |
|---|---|---|
| 4 | 6 | −22.88 |
| 5 | 7 | 877.64 |
| 6 | 9 | −38.58 |
| 7 | 11 | 31.22 |
| 8 | 13 | −48.82 |
| 9 | 15 | 33.20 |
| 10 | 17 | −28.08 |
| 11 | 20 | 26.57 |
| 12 | 22 | −43.91 |
| 13 | 23 | 27.67 |
| 14 | 25 | −14.81 |
| 15 | 26 | 22.36 |
| 16 | 28 | 73.59 |
| 17 | 30 | 51.39 |
| 18 | 32 | −36.25 |
| 19 | 34 | 0.00 |
| 20 | 36 | 0.00 |

The amount of eccentricity from the optical axis of the LRb unit for correcting 0.3 degree rotational blur of the total optical system at the telephoto end: 0.61 mm

(Numerical Embodiment 4)
unit mm surface data

| surface number | r | d | nd | vd | effective diameter |
|---|---|---|---|---|---|
| 1 | 83.535 | 2.00 | 1.90366 | 31.3 | 51.03 |
| 2 | 47.541 | 6.87 | 1.49700 | 81.5 | 46.78 |
| 3 | 293.619 | 0.15 | | | 45.27 |
| 4 | 50.546 | 5.91 | 1.60311 | 60.6 | 44.16 |
| 5 | 367.087 | (variable) | | | 43.40 |
| 6 | 196.599 | 1.20 | 1.83481 | 42.7 | 28.12 |
| 7 | 14.115 | 7.00 | | | 21.25 |
| 8 | −41.713 | 0.90 | 1.80400 | 46.6 | 20.74 |
| 9 | 49.783 | 0.18 | | | 20.49 |
| 10 | 31.814 | 4.08 | 1.92286 | 20.9 | 20.67 |
| 11 | −59.109 | 0.85 | 1.88300 | 40.8 | 20.34 |
| 12 | 209.378 | (variable) | | | 19.88 |
| 13 | 48.273 | 1.52 | 1.80400 | 46.6 | 13.03 |
| 14 | −189.903 | (variable) | | | 13.12 |
| 15 | −52.507 | 0.80 | 1.80000 | 29.8 | 13.92 |
| 16 | 127.536 | (variable) | | | 14.19 |
| 17* | 18.314 | 4.00 | 1.58313 | 59.4 | 15.59 |
| 18 | −108.197 | 1.50 | | | 15.49 |
| 19 (stop) | ∞ | 1.50 | | | 15.22 |
| 20 | 20.155 | 0.90 | 1.84666 | 23.8 | 14.77 |
| 21 | 11.906 | 4.89 | 1.48749 | 70.2 | 13.99 |
| 22 | −55.753 | (variable) | | | 13.52 |
| 23 | 95.754 | 0.70 | 1.88300 | 40.8 | 11.02 |
| 24 | 12.537 | 2.13 | 1.80518 | 25.4 | 10.53 |
| 25 | 26.077 | (variable) | | | 10.42 |
| 26 | 20.826 | 2.90 | 1.57099 | 50.8 | 14.14 |
| 27 | −83.360 | 1.42 | | | 14.20 |
| 28 | −18.585 | 3.42 | 1.68893 | 31.1 | 14.20 |
| 29 | −12.126 | 0.73 | | | 14.91 |
| 30* | −10.882 | 1.40 | 1.85135 | 40.1 | 14.58 |
| 31 | −41.506 | (variable) | | | 16.18 |
| 32 | ∞ | 1.21 | 1.51633 | 64.1 | 30.00 |
| 33 | ∞ | 1.10 | | | 30.00 |
| 34 | ∞ | 0.50 | 1.51633 | 64.1 | 30.00 |
| 35 | ∞ | | | | 30.00 |
| image plane | ∞ | | | | | aspherical surface data

17th surface

K = 0.00000e+000  A4 = −3.03167e−005  A6 = −1.86815e−008
A8 = −3.15213e−011

30th surface

K = 0.00000e+000  A4 = 1.14172e−005  A6 = −5.62724e−009
A8 = 5.10164e−009  A10 = −2.89528e−011 various data
zoom ratio 7.14

| | wide-angle | middle | telephoto |
|---|---|---|---|
| focal length | 16.48 | 51.87 | 117.70 |
| F-number | 3.60 | 5.30 | 5.88 |
| angle of view | 39.65 | 14.75 | 6.62 |
| image height | 13.66 | 13.66 | 13.66 |
| total lens length | 114.75 | 138.55 | 162.35 |
| BF | 0.50 | 0.50 | 0.50 |
| d5 | 1.20 | 23.53 | 42.90 |
| d12 | 23.64 | 6.53 | 0.70 |
| d14 | 4.83 | 5.51 | 6.88 |
| d16 | 3.83 | 3.14 | 1.77 |
| d22 | 1.80 | 3.70 | 4.96 |
| d25 | 6.36 | 4.46 | 3.20 |
| d31 | 12.83 | 31.41 | 41.68 |
| entrance pupil position | 29.69 | 79.45 | 179.53 |
| exit pupil position | −32.14 | −50.10 | −59.92 |
| front principal point position | 37.85 | 78.14 | 67.96 |
| rear principal point position | −15.98 | −51.37 | −117.20 | zoom lens unit data

| unit | leading surface | focal length | lens structure length | front principal point position | rear principal point position |
|---|---|---|---|---|---|
| L1 | 1 | 92.25 | 14.93 | 3.29 | −6.26 |
| L2 | 6 | −14.66 | 14.21 | 1.70 | −8.80 |
| L3 | 13 | 48.01 | 1.52 | 0.17 | −0.67 |
| L4 | 15 | −46.40 | 0.80 | 0.13 | −0.31 |
| LRa | 17 | 18.93 | 12.79 | 2.75 | −7.21 |
| LRb | 23 | −36.20 | 2.83 | 1.82 | 0.25 |
| LRc | 26 | 471.10 | 9.87 | −59.65 | −59.19 |
| G | 32 | ∞ | 2.81 | 1.11 | −1.11 | single lens data

| lens | leading surface | focal length |
|---|---|---|
| 1 | 1 | −125.41 |
| 2 | 2 | 113.09 |
| 3 | 4 | 96.51 |
| 4 | 6 | −18.27 |
| 5 | 8 | −28.11 |
| 6 | 10 | 22.90 |
| 7 | 11 | −52.13 |
| 8 | 13 | 48.01 |
| 9 | 15 | −46.40 |
| 10 | 17 | 27.18 |
| 11 | 20 | −36.17 |
| 12 | 21 | 20.61 |
| 13 | 23 | −16.40 |
| 14 | 24 | 28.02 |
| 15 | 26 | 29.48 |
| 16 | 28 | 41.65 |
| 17 | 30 | −17.70 |
| 18 | 32 | 0.00 |
| 19 | 34 | 0.00 |

The amount of eccentricity from the optical axis of the LRb unit for correcting 0.3 degree rotational blur of the total optical system at the telephoto end: 0.38 mm

(Numerical Embodiment 5)
unit mm surface data

| surface number | r | d | nd | vd | effective diameter |
|---|---|---|---|---|---|
| 1 | 83.261 | 2.00 | 1.80610 | 33.3 | 50.00 |
| 2 | 45.157 | 7.22 | 1.49700 | 81.5 | 47.96 |
| 3 | 209.461 | 0.15 | | | 47.55 |
| 4 | 51.577 | 6.21 | 1.60311 | 60.6 | 46.47 |
| 5 | 353.164 | (variable) | | | 45.72 |
| 6 | 215.870 | 1.20 | 1.83481 | 42.7 | 26.96 |
| 7 | 13.858 | 6.67 | | | 20.59 |
| 8 | −41.872 | 0.90 | 1.83481 | 42.7 | 20.14 |
| 9 | 47.845 | 0.32 | | | 19.99 |
| 10 | 31.431 | 4.86 | 1.84666 | 23.8 | 20.26 |
| 11 | −33.545 | 0.15 | | | 19.98 |
| 12 | −41.185 | 0.85 | 1.88300 | 40.8 | 19.48 |
| 13 | 226.151 | (variable) | | | 18.99 |
| 14 | 49.049 | 1.49 | 1.83481 | 42.7 | 13.04 |
| 15 | −179.433 | (variable) | | | 13.13 |
| 16 | −57.490 | 0.80 | 1.80000 | 29.8 | 13.84 |
| 17 | 110.958 | (variable) | | | 14.09 |
| 18* | 20.775 | 3.40 | 1.58313 | 59.4 | 14.72 |
| 19 | −151.680 | 1.50 | | | 14.72 |
| 20 (stop) | ∞ | 1.50 | | | 14.63 |
| 21 | 19.671 | 0.90 | 1.84666 | 23.8 | 14.46 |
| 22 | 12.986 | 4.35 | 1.48749 | 70.2 | 13.87 |
| 23 | −55.870 | (variable) | | | 13.51 |
| 24 | 131.200 | 0.70 | 1.90366 | 31.3 | 10.51 |
| 25 | 11.155 | 2.15 | 1.84666 | 23.8 | 10.62 |
| 26 | 29.632 | (variable) | | | 10.74 |
| 27 | 20.432 | 2.98 | 1.57099 | 50.8 | 14.61 |
| 28 | −106.631 | 1.44 | | | 14.64 |
| 29 | −18.761 | 3.42 | 1.68893 | 31.1 | 14.63 |
| 30 | −12.469 | 0.93 | | | 15.34 |
| 31* | −10.856 | 1.40 | 1.85135 | 40.1 | 14.95 |
| 32 | −34.555 | (variable) | | | 16.63 |
| 33 | ∞ | 1.21 | 1.51633 | 64.1 | 30.00 |
| 34 | ∞ | 1.10 | | | 30.00 |
| 35 | ∞ | 0.50 | 1.51633 | 64.1 | 30.00 |
| 36 | ∞ | | | | 30.00 |
| image plane | ∞ | | | | | aspherical surface data

18th surface

K = 0.00000e+000   A4 = −2.38371e−005   A6 = −1.55058e−008
A8 = −8.26915e−012

31st surface

K = 0.00000e+000   A4 = 5.74384e−006   A6 = 1.33560e−008
A8 = 4.21980e−009   A10 = −5.89399e−012 various data
zoom ratio 7.14

| | wide-angle | middle | telephoto |
|---|---|---|---|
| focal length | 16.48 | 52.20 | 117.70 |
| F-number | 3.60 | 5.30 | 5.88 |
| angle of view | 39.65 | 14.67 | 6.62 |
| image height | 13.66 | 13.66 | 13.66 |
| total lens length | 115.59 | 139.75 | 163.91 |
| BF | 0.50 | 0.50 | 0.50 |
| d5 | 1.20 | 23.82 | 45.95 |
| d13 | 24.31 | 6.42 | 0.77 |
| d15 | 5.93 | 5.77 | 6.61 |
| d17 | 1.13 | 1.30 | 0.46 |
| d23 | 2.91 | 5.55 | 7.03 |
| d26 | 6.69 | 4.05 | 2.57 |
| d32 | 12.62 | 32.05 | 39.74 |
| entrance pupil position | 29.62 | 78.11 | 191.74 |
| exit pupil position | −33.37 | −32.43 | −31.84 |
| front principal point position | 38.08 | 78.28 | 76.46 |
| rear principal point position | −15.98 | −32.27 | −90.08 | zoom lens unit data

| unit | leading surface | focal length | lens structure length | front principal point position | rear principal point position |
|---|---|---|---|---|---|
| L1 | 1 | 96.03 | 15.58 | 3.18 | −6.85 |
| L2 | 6 | −14.36 | 14.95 | 1.55 | −9.52 |
| L3 | 14 | 46.28 | 1.49 | 0.17 | −0.64 |
| L4 | 16 | −47.24 | 0.80 | 0.15 | −0.29 |
| LRa | 18 | 19.41 | 11.66 | 2.88 | −6.25 |
| LRb | 24 | −37.52 | 2.85 | 1.71 | 0.17 |
| LRc | 27 | 243.81 | 10.16 | −29.09 | −32.50 |
| G | 33 | ∞ | 2.81 | 1.11 | −1.11 | single lens data

| lens | leading surface | focal length |
|---|---|---|
| 1 | 1 | −125.35 |
| 2 | 2 | 114.17 |
| 3 | 4 | 99.37 |
| 4 | 6 | −17.79 |
| 5 | 8 | −26.63 |
| 6 | 10 | 19.85 |
| 7 | 12 | −39.40 |
| 8 | 14 | 46.28 |
| 9 | 16 | −47.24 |
| 10 | 18 | 31.56 |
| 11 | 21 | −48.10 |
| 12 | 22 | 22.07 |
| 13 | 24 | −13.53 |
| 14 | 25 | 20.06 |
| 15 | 27 | 30.29 |
| 16 | 29 | 44.17 |
| 17 | 31 | −19.11 |
| 18 | 33 | 0.00 |
| 19 | 35 | 0.00 |

The amount of eccentricity from the optical axis of the LRb unit for correcting 0.3 degree rotational blur of the total optical system at the telephoto end: 0.41 mm

(Numerical Embodiment 6)
unit mm surface data

| surface number | r | d | nd | vd | effective diameter |
|---|---|---|---|---|---|
| 1 | 56.190 | 1.70 | 1.92286 | 18.9 | 35.60 |
| 2 | 40.237 | 4.75 | 1.77250 | 49.6 | 32.99 |
| 3 | 573.674 | (variable) | | | 31.36 |
| 4 | 45.473 | 1.20 | 1.85135 | 40.1 | 24.65 |
| 5* | 10.869 | 7.30 | | | 18.17 |
| 6 | −24.954 | 1.00 | 1.77250 | 49.6 | 17.54 |
| 7 | −226.662 | 0.15 | | | 17.59 |
| 8 | 32.276 | 2.20 | 1.92286 | 18.9 | 17.55 |
| 9 | 305.369 | (variable) | | | 17.24 |
| 10 | 20.159 | 1.90 | 1.77250 | 49.6 | 10.81 |
| 11 | −1578.072 | (variable) | | | 10.45 |
| 12 | −21.285 | 0.55 | 1.83481 | 42.7 | 9.48 |
| 13 | 39.963 | (variable) | | | 9.69 |
| 14 | 13.443 | 3.50 | 1.72916 | 54.7 | 10.16 |
| 15 | −14.797 | 0.80 | 1.80809 | 22.8 | 9.98 |
| 16 | −27.609 | 0.80 | | | 9.93 |
| 17 (stop) | ∞ | 2.00 | | | 9.45 |
| 18* | 21.400 | 1.85 | 1.58313 | 59.4 | 8.56 |
| 19* | 40.298 | (variable) | | | 8.93 |
| 20 | −154.216 | 0.60 | 1.90366 | 31.3 | 9.89 |
| 21 | 25.487 | (variable) | | | 10.21 |

-continued (Numerical Embodiment 6)
unit mm

| | | | | | |
|---|---|---|---|---|---|
| 22 | 26.255 | 2.00 | 1.52996 | 55.8 | 18.02 |
| 23* | 33.979 | 1.20 | | | 18.49 |
| 24 | 137.466 | 1.40 | 1.80518 | 25.4 | 18.76 |
| 25 | −190.013 | (variable) | | | 19.05 |
| 26 | ∞ | 1.21 | 1.51633 | 64.1 | 30.00 |
| 27 | ∞ | 1.10 | | | 30.00 |
| 28 | ∞ | 0.50 | 1.51633 | 64.1 | 30.00 |
| 29 | ∞ | | | | 30.00 |
| image plane | ∞ | | | | | aspherical surface data

5th surface

K = −4.24489e−005  A4 = −1.19387e−005  A6 = 1.29199e−008
A8 = −3.04608e−010  A10 = −7.90463e−012

18th surface

K = −3.61129e+000  A4 = −1.06487e−004  A6 = −6.11011e−006
A8 = −8.02222e−008  A10 = −1.71559e−009  A12 = 6.43346e−011

19th surface

K = −3.06807e+000  A4 = 1.39684e−004  A6 = −5.13683e−006
A8 = −1.03318e−007  A10 = 2.01327e−009  A12 = −1.17453e−012

23rd surface

K = 2.66621e+000  A4 = −2.46434e−005  A6 = −7.14075e−008
A8 = 1.40114e−009  A10 = −4.63147e−012 various data
zoom ratio 2.71

| | wide-angle | middle | telephoto |
|---|---|---|---|
| focal length | 18.50 | 34.43 | 50.10 |
| F-number | 3.60 | 4.77 | 5.88 |
| angle of view | 36.44 | 21.64 | 15.25 |
| image height | 13.66 | 13.66 | 13.66 |
| total lens length | 78.50 | 89.36 | 100.73 |
| BF | 0.50 | 0.50 | 0.50 |
| d3 | 0.60 | 8.76 | 12.91 |
| d9 | 12.77 | 4.43 | 0.60 |
| d11 | 4.75 | 5.72 | 6.30 |
| d13 | 1.37 | 0.40 | 0.15 |
| d19 | 2.50 | 2.50 | 2.17 |
| d21 | 6.67 | 6.67 | 6.67 |
| d25 | 11.63 | 22.68 | 33.72 |
| entrance pupil position | 20.85 | 33.70 | 41.61 |
| exit pupil position | −31.24 | −42.29 | −53.02 |
| front principal point position | 28.56 | 40.42 | 44.81 |
| rear principal point position | −18.00 | −33.93 | −49.60 | zoom lens unit data

| unit | leading surface | focal length | lens structure length | front principal point position | rear principal point position |
|---|---|---|---|---|---|
| L1 | 1 | 87.26 | 6.45 | −0.71 | −4.25 |
| L2 | 4 | −16.78 | 11.85 | 0.75 | −9.25 |
| L3 | 10 | 25.78 | 1.90 | 0.01 | −1.06 |
| L4 | 12 | −16.57 | 0.55 | 0.10 | −0.19 |
| LRa | 14 | 11.78 | 8.95 | 1.33 | −5.30 |
| LRb | 20 | −24.17 | 0.60 | 0.27 | −0.04 |
| LRc | 22 | 67.88 | 4.60 | 0.58 | −2.76 |
| G | 26 | ∞ | 2.81 | 1.11 | −1.11 | single lens data

| lens | leading surface | focal length |
|---|---|---|
| 1 | 1 | −161.85 |
| 2 | 2 | 55.80 |
| 3 | 4 | −17.05 |
| 4 | 6 | −36.38 |

-continued (Numerical Embodiment 6)
unit mm

| 5 | 8 | 38.96 |
|---|---|---|
| 6 | 10 | 25.78 |
| 7 | 12 | −16.57 |
| 8 | 14 | 10.19 |
| 9 | 15 | −40.59 |
| 10 | 18 | 75.53 |
| 11 | 20 | −24.17 |
| 12 | 22 | 200.00 |
| 13 | 24 | 99.25 |
| 14 | 26 | 0.00 |
| 15 | 28 | 0.00 |

The amount of eccentricity from the optical axis of the LRb unit for correcting 0.3 degree rotational blur of the total optical system at the telephoto end: 0.15 mm (Numerical Embodiment 7)
unit mm surface data

| surface number | r | d | nd | vd | effective diameter |
|---|---|---|---|---|---|
| 1 | 52.377 | 1.70 | 1.84666 | 23.8 | 33.30 |
| 2 | 34.328 | 4.80 | 1.72916 | 54.7 | 31.60 |
| 3 | 291.565 | (variable) | | | 30.82 |
| 4 | 45.828 | 1.20 | 1.88300 | 40.8 | 21.74 |
| 5 | 12.265 | 5.23 | | | 17.39 |
| 6 | −43.981 | 1.00 | 1.83481 | 42.7 | 16.82 |
| 7 | 34.823 | 0.16 | | | 16.33 |
| 8 | 24.376 | 2.30 | 1.95906 | 17.5 | 16.38 |
| 9 | 286.705 | (variable) | | | 16.07 |
| 10 | 20.886 | 1.25 | 1.77250 | 49.6 | 10.66 |
| 11 | 54.345 | (variable) | | | 10.22 |
| 12 | −16.270 | 0.55 | 1.83400 | 37.2 | 9.18 |
| 13 | −50.412 | (variable) | | | 9.49 |
| 14 | 13.537 | 4.25 | 1.72916 | 54.7 | 10.88 |
| 15 | −15.268 | 0.60 | 1.84666 | 23.8 | 10.48 |
| 16 | −33.337 | 0.80 | | | 10.34 |
| 17 (stop) | ∞ | 2.00 | | | 9.72 |
| 18* | 36.587 | 1.35 | 1.55332 | 71.7 | 8.71 |
| 19* | 95.950 | (variable) | | | 8.52 |
| 20 | −92.213 | 0.60 | 1.91082 | 35.3 | 9.45 |
| 21 | 29.079 | (variable) | | | 9.71 |
| 22 | 26.737 | 1.80 | 1.90270 | 31.0 | 18.01 |
| 23* | 47.758 | (variable) | | | 18.05 |
| 24 | ∞ | 1.21 | 1.51633 | 64.1 | 30.00 |
| 25 | ∞ | 1.10 | | | 30.00 |
| 26 | ∞ | 0.50 | 1.51633 | 64.1 | 30.00 |
| 27 | ∞ | | | | 30.00 |
| image plane | ∞ | | | | | aspherical surface data

18th surface

K = −3.33163e+001  A4 = −1.55986e−004  A6 = −4.62425e−007
A8 = −3.50894e−007  A10 = 1.57963e−008  A12 = −2.45153e−010

19th surface

K = 0.00000e+000  A4 = 2.00254e−005  A6 = 5.90578e−007
A8 = −2.31240e−007  A10 = 1.26439e−008  A12 = −2.16377e−010

23rd surface

K = 4.59006e+000  A4 = 5.99849e−007  A6 = 8.01623e−009
A8 = −3.63247e−010  A10 = 1.56772e−012 various data
zoom ratio 2.88

| | wide-angle | middle | telephoto |
|---|---|---|---|

(Numerical Embodiment 7)
unit mm

| | | | |
|---|---|---|---|
| focal length | 18.50 | 33.80 | 53.35 |
| F-number | 3.60 | 4.73 | 5.88 |
| angle of view | 36.44 | 22.01 | 10.20 |
| image height | 13.66 | 13.66 | 9.60 |
| total lens length | 76.00 | 91.63 | 109.71 |
| BF | 0.50 | 0.50 | 0.50 |
| d3 | 0.60 | 11.65 | 21.47 |
| d9 | 9.14 | 3.03 | 0.60 |
| d11 | 3.19 | 5.47 | 7.09 |
| d13 | 4.94 | 2.67 | 1.05 |
| d19 | 2.88 | 2.88 | 2.88 |
| d21 | 8.85 | 8.92 | 9.48 |
| d23 | 13.49 | 24.11 | 34.25 |
| entrance pupil position | 20.34 | 38.43 | 60.78 |
| exit pupil position | −33.39 | −44.13 | −55.14 |
| front principal point position | 28.74 | 46.63 | 62.97 |
| rear principal point position | −18.00 | −33.30 | −52.85 | zoom lens unit data

| unit | leading surface | focal length | lens structure length | front principal point position | rear principal point position |
|---|---|---|---|---|---|
| L1 | 1 | 95.99 | 6.50 | −1.19 | −4.84 |
| L2 | 4 | −16.75 | 9.89 | 1.29 | −6.40 |
| L3 | 10 | 43.21 | 1.25 | −0.43 | −1.13 |
| L4 | 12 | −29.02 | 0.55 | −0.14 | −0.45 |
| LRa | 14 | 13.26 | 9.00 | 1.31 | −5.42 |
| LRb | 20 | −24.21 | 0.60 | 0.24 | −0.08 |
| LRc | 22 | 64.66 | 1.80 | −1.16 | −2.07 |
| G | 24 | ∞ | 2.81 | 1.11 | −1.11 | single lens data

| lens | leading surface | focal length |
|---|---|---|
| 1 | 1 | −122.97 |
| 2 | 2 | 52.94 |
| 3 | 4 | −19.29 |
| 4 | 6 | −23.15 |
| 5 | 8 | 27.66 |
| 6 | 10 | 43.21 |
| 7 | 12 | −29.02 |
| 8 | 14 | 10.49 |
| 9 | 15 | −33.78 |
| 10 | 18 | 106.02 |
| 11 | 20 | −24.21 |
| 12 | 22 | 64.66 |
| 13 | 24 | 0.00 |
| 14 | 26 | 0.00 |

The amount of eccentricity from the optical axis of the LRb unit for correcting 0.3 degree rotational blur of the total optical system at the telephoto end: 0.16 mm

TABLE 1

| conditional expression | lower limit | upper limit | first embodiment | second embodiment | third embodiment | fourth embodiment |
|---|---|---|---|---|---|---|
| (1) | 0.73 | 2.00 | 1.064 | 1.023 | 0.860 | 0.852 |
| (2) | 0.80 | 2.50 | 1.107 | 1.136 | 1.922 | 1.871 |
| (3) | 2.00 | 8.00 | 4.995 | 5.372 | 5.746 | 5.598 |
| (4) | 0.50 | 1.20 | 0.898 | 0.851 | 0.894 | 0.890 |
| (5) | 3.00 | 9.00 | 5.561 | 6.315 | 6.429 | 6.293 |
| (6) | −3.50 | −1.00 | −2.137 | −2.028 | −1.649 | −1.640 |
| (7) | 0.10 | 1.40 | 0.366 | 0.377 | 0.873 | 0.552 |
| (8) | 1.00 | 10.00 | 1.590 | 2.180 | 5.165 | 3.672 |
| (9) | 0.60 | 5.00 | 1.423 | 1.617 | 1.509 | 2.816 |
| (10) | 0.80 | 1.80 | 1.211 | 1.100 | 1.201 | 1.199 |
| (11) | 0.80 | 2.00 | 1.139 | 1.075 | 1.397 | 1.407 |
| (12) | 0.01 | 1.00 | 0.309 | 0.319 | 0.106 | 0.164 |
| (13) | 0.80 | 5.00 | 1.376 | 1.643 | 2.041 | 1.650 |

| conditional expression | lower limit | upper limit | fifth embodiment | sixth embodiment | seventh embodiment |
|---|---|---|---|---|---|
| (1) | 0.73 | 2.00 | 0.819 | 1.044 | 1.062 |
| (2) | 0.80 | 2.50 | 1.926 | 1.647 | 1.412 |
| (3) | 2.00 | 8.00 | 5.827 | 4.717 | 5.189 |
| (4) | 0.50 | 1.20 | 0.872 | 0.907 | 0.905 |
| (5) | 3.00 | 9.00 | 6.686 | 5.200 | 5.731 |
| (6) | −3.50 | −1.00 | −1.505 | −1.750 | −1.750 |
| (7) | 0.10 | 1.40 | 0.587 | 0.325 | 0.337 |
| (8) | 1.00 | 10.00 | 4.428 | 6.051 | 3.171 |
| (9) | 0.60 | 5.00 | 2.866 | 0.896 | 1.569 |
| (10) | 0.80 | 1.80 | 1.161 | 1.220 | 1.199 |
| (11) | 0.80 | 2.00 | 1.418 | 1.168 | 1.128 |
| (12) | 0.01 | 1.00 | 0.165 | 0.293 | 0.321 |
| (13) | 0.80 | 5.00 | 1.782 | 1.006 | 1.576 |

TABLE 2

| | first embodiment | second embodiment | third embodiment | fourth embodiment |
|---|---|---|---|---|
| f12w | −22.492 | −20.344 | −22.347 | −19.764 |
| f3Rw | 21.149 | 19.893 | 25.976 | 23.191 |
| fis | −18.261 | −19.335 | −39.325 | −36.200 |
| fRt | 16.497 | 17.018 | 20.463 | 19.351 |
| f1 | 92.786 | 99.382 | 106.873 | 92.247 |
| fw | 18.576 | 18.500 | 18.600 | 16.480 |
| f2 | −16.686 | −15.738 | −16.623 | −14.660 |
| βist | 5.873 | 6.716 | 5.327 | 3.102 |
| βisRt | 0.439 | 0.355 | 0.381 | 0.780 |
| List | 6.800 | 6.976 | 16.229 | 9.089 |
| Risf | −42.910 | −55.761 | 170.102 | 95.754 |
| Risr | 26.991 | 25.575 | 32.932 | 26.077 |
| f4 | −26.429 | −29.908 | −28.076 | −46.401 |
| ft | 53.355 | 53.353 | 193.230 | 117.700 |
| X1 | −26.564 | −33.110 | −65.805 | −47.600 |
| X3 | −19.308 | −20.152 | −32.247 | −28.840 |

| | fifth embodiment | sixth embodiment | seventh embodiment |
|---|---|---|---|
| f12w | −19.137 | −22.566 | −22.174 |
| f3Rw | 23.360 | 21.615 | 20.871 |
| fis | −37.524 | −24.165 | −24.215 |
| fRt | 19.478 | 14.671 | 17.147 |
| f1 | 96.034 | 87.258 | 95.989 |
| fw | 16.480 | 18.500 | 18.500 |
| f2 | −14.363 | −16.780 | −16.750 |
| βist | 3.174 | 5.144 | 5.416 |
| βisRt | 0.693 | 0.422 | 0.396 |
| List | 9.666 | 6.019 | 6.229 |
| Risf | 131.200 | −154.216 | −92.213 |
| Risr | 29.632 | 25.487 | 29.079 |
| f4 | −47.237 | −16.568 | −29.018 |
| ft | 117.700 | 50.100 | 53.351 |
| X1 | −48.325 | −22.232 | −33.715 |
| X3 | −27.117 | −22.094 | −21.388 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-134846 filed Jun. 14, 2012, which is hereby incorporated by reference herein in its entirety.

What is claimed is:

1. A zoom lens comprising, in order from the object side to the image side:
   a first lens unit of positive refractive power;
   a second lens unit of negative refractive power;
   a third lens unit of positive refractive power;
   a fourth lens unit of negative refractive power, and
   a rear lens unit,
   wherein the rear lens unit includes, in order from the object side to the image side, a first lens subunit of positive refractive power, a second lens subunit of negative refractive power, and a third lens subunit of positive refractive power,
   wherein during zooming, the distance between the first lens unit and the second lens unit, the distance between the second lens unit and the third lens unit, the distance between the third lens unit and the fourth lens unit, and the distance between the fourth lens unit and the first lens subunit each change,
   wherein the second lens subunit is movable in a direction having a component perpendicular to the optical axis, and
   wherein the following conditional expressions are satisfied:

$$0.73 < |f12w|/f3Rw < 2.0, \text{ and}$$

$$0.8 < |fis|/fRt < 2.5,$$

where f12w is the combined focal length of the first lens unit and the second lens unit during focusing on an object at infinity at the wide-angle end, f3Rw is the combined focal length of the third lens unit and the lens units placed on the image side of the third lens unit during focusing on an object at infinity at the wide-angle end, fis is the focal length of the second lens subunit, and fRt is the combined focal length of the rear lens unit during focusing on an object at infinity at the telephoto end.

2. The zoom lens according to claim 1, wherein the following conditional expression is satisfied:

$$2.0 < f1/fw < 8.0,$$

where f1 is the focal length of the first lens unit, and fw is the focal length of the total zoom lens system at the wide-angle end.

3. The zoom lens according to claim 1, wherein the following conditional expression is satisfied:

$$0.5 < |f2|/fw < 1.2,$$

where f2 is the focal length of the second lens unit, and fw is the focal length of the total zoom lens system at the wide-angle end.

4. The zoom lens according to claim 1, wherein the following conditional expression is satisfied:

$$3.0 < f1/|f2| < 9.0,$$

where f1 is the focal length of the first lens unit, and f2 is the focal length of the second lens unit.

5. The zoom lens according to claim 1, wherein the following conditional expression is satisfied:

$$-3.5 < (1-\beta ist)^* \beta isRt < -1.0,$$

where $\beta ist$ is the lateral magnification of the second lens subunit during focusing on an object at infinity at the telephoto end, and $\beta isRt$ is the combined lateral magnification of the lens units placed on the image side of the second lens subunit during focusing on an object at infinity at the telephoto end.

6. The zoom lens according to claim 1, further comprising an aperture stop between the second lens unit and the third lens subunit,
   wherein the following conditional expression is satisfied:

$$0.1 < List/fw < 1.4,$$

where List is the distance between the aperture stop and the object-side surface of the second lens subunit at the telephoto end, and fw is the focal length of the total zoom lens system at the wide-angle end.

7. The zoom lens according to claim 1, wherein the following conditional expression is satisfied:

$$1.0 < |Risf/Risr| < 10.0,$$

where Risf is the curvature radius of the object-side surface of the second lens subunit, and Risr is the curvature radius of the image-side surface of the second lens subunit.

8. The zoom lens according to claim 1, wherein the following conditional expression is satisfied:

$$0.6 < |f4|/fw < 5.0,$$

where f4 is the focal length of the fourth lens unit, and fw is the focal length of the total zoom lens system at the wide-angle end.

9. The zoom lens according to claim 1, wherein the following conditional expression is satisfied:

$$0.8 < |f12w|/fw < 1.8,$$

where fw is the focal length of the total zoom lens system at the wide-angle end.

10. The zoom lens according to claim 1, wherein the following conditional expression is satisfied:

$$0.8 < f3Rw/fw < 2.0,$$

where fw is the focal length of the total zoom lens system at the wide-angle end.

11. The zoom lens according to claim 1, wherein the following conditional expression is satisfied:

$$0.01 < fRt/ft < 1.0,$$

where ft is the focal length of the total zoom lens system at the telephoto end.

12. The zoom lens according to claim 1, wherein the following conditional expression is satisfied:

$$0.8 < X1/X3 < 5.0,$$

where X1 is the moving distance of the first lens unit during zooming from the wide-angle end to the telephoto end, X3 is the moving distance of the third lens unit during zooming from the wide-angle end to the telephoto end, and the movement toward the image side during zooming from the wide-angle end to the telephoto end is positive.

13. The zoom lens according to claim 1, wherein during zooming, the first, second, and third lens subunits move integrally.

14. The zoom lens according to claim 1, wherein during zooming, the distance between the first lens subunit and the second lens subunit changes, and the distance between the second lens subunit and the third lens subunit changes.

15. The zoom lens according to claim 1, wherein during zooming, the second and third lens subunits move integrally, and the distance between the first lens subunit and the second lens subunit changes.

16. The zoom lens according to claim 1, wherein during zooming, the first and second lens subunits move integrally, and the distance between the second lens subunit and the third lens subunit changes.

17. The zoom lens according to claim 1, further comprising an aperture stop between the second lens unit and the third lens subunit, wherein at least one of the lens units placed on the image side of the second lens unit and on the object side of the aperture stop serves as a focus lens unit that moves on the optical axis and performs focusing operation.

18. An optical apparatus equipped with a zoom lens, wherein the zoom lens comprises in order from the object side to the image side:
- a first lens unit of positive refractive power;
- a second lens unit of negative refractive power;
- a third lens unit of positive refractive power;
- a fourth lens unit of negative refractive power, and
- a rear lens unit,
- wherein the rear lens unit includes, in order from the object side to the image side, a first lens subunit of positive refractive power, a second lens subunit of negative refractive power, and a third lens subunit of positive refractive power,
- wherein during zooming, the distance between the first lens unit and the second lens unit, the distance between the second lens unit and the third lens unit, the distance between the third lens unit and the fourth lens unit, and the distance between the fourth lens unit and the first lens subunit each change,
- wherein the second lens subunit is movable in a direction having a component perpendicular to the optical axis, and
- wherein the following conditional expressions are satisfied:

$$0.73 < |f12w|/f3Rw < 2.0, \text{ and}$$

$$0.8 < |fis|/fRt < 2.5,$$

where f12w is the combined focal length of the first lens unit and the second lens unit during focusing on an object at infinity at the wide-angle end, f3Rw is the combined focal length of the third lens unit and the lens units placed on the image side of the third lens unit during focusing on an object at infinity at the wide-angle end, fis is the focal length of the second lens subunit, and fRt is the combined focal length of the rear lens unit during focusing on an object at infinity at the telephoto end.

* * * * *